(12) United States Patent
Kothari et al.

(10) Patent No.: US 11,841,846 B1
(45) Date of Patent: Dec. 12, 2023

(54) GENERATING OBJECT MORPHISMS DURING OBJECT SEARCH

(71) Applicant: ThoughtSpot, Inc., San Jose, CA (US)

(72) Inventors: Rakesh Kothari, San Jose, CA (US); Nikhil Yadav, Sunnyvale, CA (US); Rahul Manikanta Balakavi, Mountain View, CA (US); Hungpin Kao, Issaquah, WA (US)

(73) Assignee: ThoughtSpot, Inc., Mountain View, CA (US)

( * ) Notice: Subject to any disclaimer, the term of this patent is extended or adjusted under 35 U.S.C. 154(b) by 0 days.

(21) Appl. No.: 17/831,765

(22) Filed: Jun. 3, 2022

(51) Int. Cl.
G06F 16/00 (2019.01)
G06F 16/23 (2019.01)
G06F 16/25 (2019.01)
G06F 16/248 (2019.01)

(52) U.S. Cl.
CPC ........ G06F 16/2365 (2019.01); G06F 16/248 (2019.01); G06F 16/254 (2019.01)

(58) Field of Classification Search
CPC ... G06F 16/2365; G06F 16/248; G06F 16/254
USPC .................................................. 707/600–899
See application file for complete search history.

(56) References Cited

U.S. PATENT DOCUMENTS

| | | | |
|---|---|---|---|
| 6,760,902 B1 * | 7/2004 | Ott | G06F 8/38 717/121 |
| 8,344,233 B2 * | 1/2013 | Cai | G10H 1/0058 84/602 |
| 10,963,477 B2 * | 3/2021 | Prophete | G06F 16/2455 |
| 2007/0130112 A1 * | 6/2007 | Lin | G06F 16/41 |
| 2014/0164298 A1 * | 6/2014 | Goranson | G06N 5/02 706/12 |
| 2016/0179945 A1 * | 6/2016 | Lastra Diaz | G06F 16/284 707/739 |
| 2018/0174104 A1 * | 6/2018 | Schikora | G06Q 10/103 |

OTHER PUBLICATIONS

Metwalli, 5 NLP Models That You Need to Know About, Towards Data Science Jan. 26, 2021, 6 pp., retrieved from https://towardsdatascience.com/5-nlp-models-that-you-need-to-know-about-754594a3225b.

* cited by examiner

Primary Examiner — Michelle N Owyang
(74) Attorney, Agent, or Firm — Young Basile Hanlon & MacFarlane, P.C.

(57) ABSTRACT

Generating object morphisms during object search includes obtaining object-search request data, wherein the object-search request data includes object-search terms, obtaining resolved-request data representing the object-search terms, determining that a first analytical object partially consistent with the resolved-request data is available, wherein the first analytical object is consistent with a first portion of the resolved-request data, generating candidate object-morphism data with respect to the first analytical object in accordance with a second portion of the resolved-request data, outputting object-search response data including the candidate object-morphism data for presentation to a user, obtaining data indicating a selected object morphism from the candidate object-morphism data, generating a second analytical object in accordance with the first analytical object and the selected object morphism, wherein the second analytical object differs from the first analytical object, and outputting response data including the second analytical object for presentation to the user.

20 Claims, 6 Drawing Sheets

GENERATING OBJECT MORPHISMS DURING OBJECT SEARCH

BACKGROUND

Advances in computer storage and database technology have led to exponential growth of the amount of data being created. Businesses are overwhelmed by the volume of the data stored in their computer systems. Existing database analytic tools are inefficient, costly to utilize, and require substantial configuration and training.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
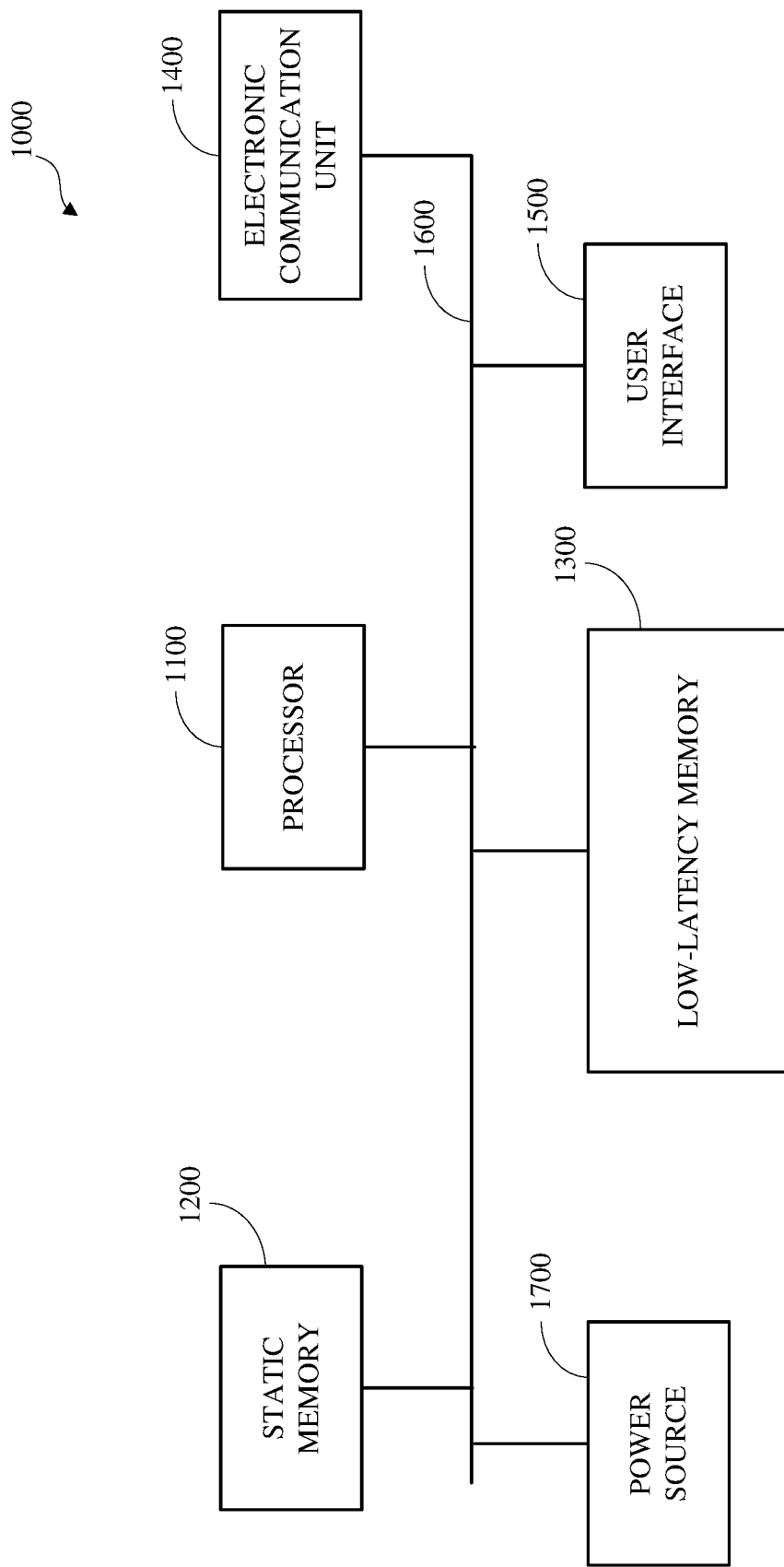
FIG. 1 is a block diagram of an example of a computing device.

Businesses and other organizations store large amounts of data, such as business records, transaction records, and the like, in data storage systems, such as relational database systems that store data as records, or rows, having values, or fields, corresponding to respective columns in tables that can be interrelated using key values. Databases structures are often normalized or otherwise organized to maximize data density and to maximize transactional data operations at the expense of increased complexity and reduced accessibility for analysis. Individual records and tables may have little or no utility without substantial correlation, interpretation, and analysis. The complexity of these data structures and the large volumes of data that can be stored therein limit the accessibility of the data and require substantial skilled human resources to code procedures and tools that allow business users to access useful data.

In some data access and analysis systems, accessing and analyzing data using a data storage system includes utilizing substantial computing resources, such as processing resources, communications resources, memory resources, and power resources, for the input, compilation, integration, testing, debugging, and management of complex manually generated computer instructions, such as high-level language computer code, expressing respective requests for data. This resource utilization is repeated for each distinct request for data and is often repeated again, for each distinct request for data, in accordance with changes to the system or the data structure. Furthermore, data access and analysis systems may be limited to outputting data expressly requested by the users and may lack the capability to identify and prioritize data other than the data expressly requested. Useful data, such as data aggregations, patterns, and statistical anomalies that would not be available in smaller data sets (e.g., 10,000 rows of data), and may not be apparent to human users, may be derivable using the large volume of data (e.g., millions or billions of rows) stored in complex data storage systems, such as relational database systems, and may be inaccessible due to the complexity and limitations of the data storage systems, corresponding data access and analysis systems, or the combination thereof.

The low-latency data access and analysis system described herein reduces the resource utilization associated with accessing and analyzing data, relative to other data access and analysis systems, by obtaining input data expressing requests for data access and analysis, or other use of the system, using natural language, or near natural language, which is substantially less input than corresponding manually generated computer instructions, automatically transforming the natural language, or near natural language, input data, which is otherwise inoperable by the system, to a form that is operable by the system, and automatically generating, compiling, integrating, and managing the computer instructions that implement the requests for data access and analysis, which also reduces or eliminates the resource utilization associated with testing and debugging. Furthermore, the low-latency data access and analysis system described herein increases the accessibility of data, and thus the capabilities of the low-latency data access and analysis system, relative to other data access and analysis systems, by automatically analyzing data stored in the data storage system, which may include automatically analyzing manually or automatically generated computer instructions, to automatically identify and prioritize data aggregations, patterns, relationships, and statistical anomalies that would otherwise be inaccessible, and by automatically generating and outputting data in a natural language form to explain or describe the automatically generated data or other system functionality to further reduce resource utilization and data accessibility by educating or guiding the user so that subsequent user input data is obtained and transformed more efficiently, such as by reducing or eliminating resource utilization associated with inaccurate or inefficient user input.

The low-latency data access and analysis system described herein further reduces resource utilization associated with repeated requests for data, or other use of the system, such as by multiple users or by a user multiple times, by automatically generating and storing analytical-object data expressing, in a form operable by the low-latency data access and analysis system, previously received and transformed requests for data access and analysis, or other use of the system, which may include storing corresponding data expressing the request in a natural language, or near natural language, form, so that the previously stored analytical objects are accessible and reusable in the low-latency data access and analysis system. The resource utilization associated with obtaining object access input data, in a natural language, or near natural language, form, indicating requests to access previously generated and stored analytical objects and to obtain results, or output, data responsive to the requests for data represented by the previously generated and stored analytical objects, and automatically transforming the object access input data to a form that is operable by the system is reduced relative to obtaining input data, in a natural language, or near natural language, form, requesting equivalent results, or output, data, and automatically transforming the requests for equivalent results, or output, data to the form operable by the system in the absence of the previously generated and stored analytical objects.

The low-latency data access and analysis system described herein may include many, such as hundreds or thousands of, previously generated and stored analytical objects and may reduce resource utilization associated with accessing respective previously stored analytical objects by obtaining input data, in a natural language, or near natural language, form, indicating requests to search the low-latency data access and analysis system for previously stored analytical objects in accordance with object search terms indicated in the input data, automatically transforming the requests to search for previously stored analytical objects to a form that is operable by the system, and automatically generating, compiling, integrating, and managing computer instructions that implement the requests to search for previously stored analytical objects, relative to the resource utilization associated with other techniques for finding and accessing previously generated and stored analytical objects.

For some requests to search for previously stored analytical objects, a previously generated and stored analytical object that is consistent with, satisfies, or accurately responds to, a request to search for previously stored analytical objects, may be unavailable in the low-latency data access and analysis system, and the low-latency data access and analysis system described herein may reduce resource utilization associated with other techniques for generating the unavailable analytical object by identifying previously stored analytical objects that are partially consistent with the request to search for previously stored analytical objects, automatically generating object morphisms based on automatically identified differences between the request to search for previously stored analytical objects and the partially consistent previously stored analytical objects, and automatically generating analytical objects that are consistent with the request to search for previously stored analytical objects based on the object morphisms and the partially consistent previously stored analytical objects.

FIG. 1 is a block diagram of an example of a computing device 1000. One or more aspects of this disclosure may be implemented using the computing device 1000. The computing device 1000 includes a processor 1100, static memory 1200, low-latency memory 1300, an electronic communication unit 1400, a user interface 1500, a bus 1600, and a power source 1700. Although shown as a single unit, any one or more element of the computing device 1000 may be integrated into any number of separate physical units. For example, the low-latency memory 1300 and the processor 1100 may be integrated in a first physical unit and the user interface 1500 may be integrated in a second physical unit. Although not shown in FIG. 1, the computing device 1000 may include other aspects, such as an enclosure or one or more sensors.

The computing device 1000 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC.

The processor 1100 may include any device or combination of devices capable of manipulating or processing a signal or other information, including optical processors, quantum processors, molecular processors, or a combination thereof. The processor 1100 may be a central processing unit (CPU), such as a microprocessor, and may include one or more processing units, which may respectively include one or more processing cores. The processor 1100 may include multiple interconnected processors. For example, the multiple processors may be hardwired or networked, including wirelessly networked. In some implementations, the operations of the processor 1100 may be distributed across multiple physical devices or units that may be coupled directly or across a network. In some implementations, the processor 1100 may include a cache, or cache memory, for internal storage of operating data or instructions. The processor 1100 may include one or more special purpose processors, one or more digital signal processor (DSP), one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, firmware, one or more state machines, or any combination thereof.

The processor 1100 may be operatively coupled with the static memory 1200, the low-latency memory 1300, the electronic communication unit 1400, the user interface 1500, the bus 1600, the power source 1700, or any combination thereof. The processor may execute, which may include controlling, such as by sending electronic signals to, receiving electronic signals from, or both, the static memory 1200, the low-latency memory 1300, the electronic communication unit 1400, the user interface 1500, the bus 1600, the power source 1700, or any combination thereof to execute, instructions, programs, code, applications, or the like, which may include executing one or more aspects of an operating system, and which may include executing one or more instructions to perform one or more aspects described herein, alone or in combination with one or more other processors.

The static memory 1200 is coupled to the processor 1100 via the bus 1600 and may include non-volatile memory, such as a disk drive, or any form of non-volatile memory capable of persistent electronic information storage, such as in the absence of an active power supply. Although shown as a single block in FIG. 1, the static memory 1200 may be implemented as multiple logical or physical units.

The static memory 1200 may store executable instructions or data, such as application data, an operating system, or a combination thereof, for access by the processor 1100. The executable instructions may be organized into programmable modules or algorithms, functional programs, codes, code segments, or combinations thereof to perform one or more aspects, features, or elements described herein. The application data may include, for example, user files, database catalogs, configuration information, or a combination thereof. The operating system may be, for example, a desktop or laptop operating system; an operating system for a mobile device, such as a smartphone or tablet device; or an operating system for a large device, such as a mainframe computer.

The low-latency memory 1300 is coupled to the processor 1100 via the bus 1600 and may include any storage medium with low-latency data access including, for example, DRAM modules such as DDR SDRAM, Phase-Change Memory (PCM), flash memory, or a solid-state drive. Although shown as a single block in FIG. 1, the low-latency memory 1300 may be implemented as multiple logical or physical units. Other configurations may be used. For example, low-latency memory 1300, or a portion thereof, and processor 1100 may be combined, such as by using a system on a chip design.

The low-latency memory 1300 may store executable instructions or data, such as application data for low-latency access by the processor 1100. The executable instructions may include, for example, one or more application programs, that may be executed by the processor 1100. The executable instructions may be organized into programmable modules or algorithms, functional programs, codes, code segments, and/or combinations thereof to perform various functions described herein.

The low-latency memory 1300 may be used to store data that is analyzed or processed using the systems or methods described herein. For example, storage of some or all data in low-latency memory 1300 instead of static memory 1200 may improve the execution speed of the systems and methods described herein by permitting access to data more quickly by an order of magnitude or greater (e.g., nanoseconds instead of microseconds).

The electronic communication unit 1400 is coupled to the processor 1100 via the bus 1600. The electronic communication unit 1400 may include one or more transceivers. The electronic communication unit 1400 may, for example, provide a connection or link to a network via a network interface. The network interface may be a wired network interface, such as Ethernet, or a wireless network interface. For example, the computing device 1000 may communicate with other devices via the electronic communication unit 1400 and the network interface using one or more network protocols, such as Ethernet, Transmission Control Protocol/Internet Protocol (TCP/IP), power line communication (PLC), Wi-Fi, infrared, ultra violet (UV), visible light, fiber optic, wire line, general packet radio service (GPRS), Global System for Mobile communications (GSM), code-division multiple access (CDMA), Long-Term Evolution (LTE), or other suitable protocols.

The user interface 1500 may include any unit capable of interfacing with a human user, such as a virtual or physical keypad, a touchpad, a display, a touch display, a speaker, a microphone, a video camera, a sensor, a printer, or any combination thereof. For example, a keypad can convert physical input of force applied to a key to an electrical signal that can be interpreted by computing device 1000. In another example, a display can convert electrical signals output by computing device 1000 to light. The purpose of such devices may be to permit interaction with a human user, for example by accepting input from the human user and providing output back to the human user. The user interface 1500 may include a display; a positional input device, such as a mouse, touchpad, touchscreen, or the like; a keyboard; or any other human and machine interface device. The user interface 1500 may be coupled to the processor 1100 via the bus 1600. In some implementations, the user interface 1500 can include a display, which can be a liquid crystal display (LCD), a cathode-ray tube (CRT), a light emitting diode (LED) display, an organic light emitting diode (OLED) display, an active-matrix organic light emitting diode (AMOLED), or other suitable display. In some implementations, the user interface 1500, or a portion thereof, may be part of another computing device (not shown). For example, a physical user interface, or a portion thereof, may be omitted from the computing device 1000 and a remote or virtual interface may be used, such as via the electronic communication unit 1400.

The bus 1600 is coupled to the static memory 1200, the low-latency memory 1300, the electronic communication unit 1400, the user interface 1500, and the power source 1700. Although a single bus is shown in FIG. 1, the bus 1600 may include multiple buses, which may be connected, such as via bridges, controllers, or adapters.

The power source 1700 provides energy to operate the computing device 1000. The power source 1700 may be a general-purpose alternating-current (AC) electric power supply, or power supply interface, such as an interface to a household power source. In some implementations, the power source 1700 may be a single use battery or a rechargeable battery to allow the computing device 1000 to operate independently of an external power distribution system. For example, the power source 1700 may include a wired power source; one or more dry cell batteries, such as nickel-cadmium (NiCad), nickel-zinc (NiZn), nickel metal hydride (NiMH), lithium-ion (Li-ion); solar cells; fuel cells; or any other device capable of powering the computing device 1000.

Figure 2:
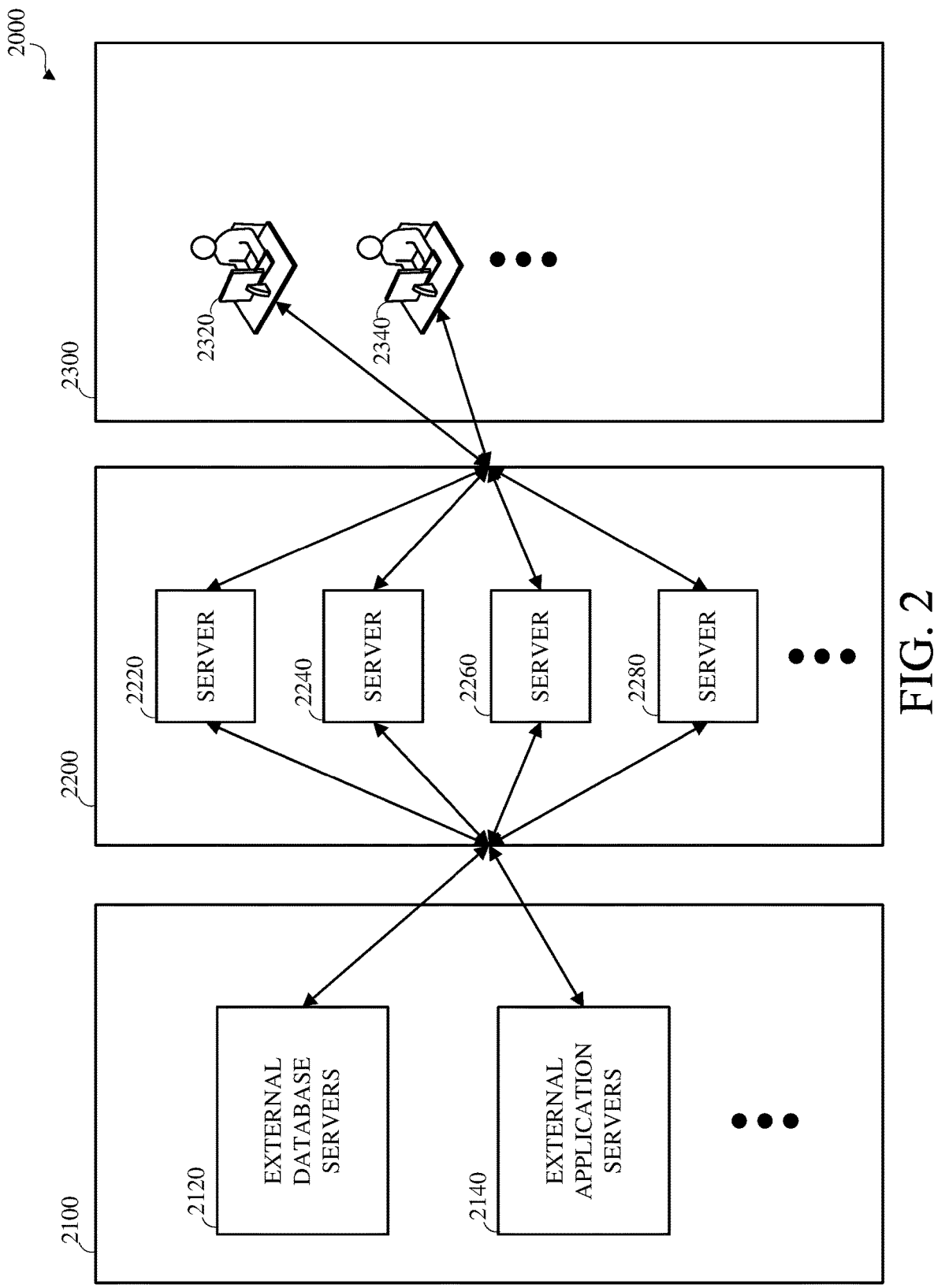
FIG. 2 is a block diagram of an example of a computing system.

FIG. 2 is a block diagram of an example of a computing system 2000. As shown, the computing system 2000 includes an external data source portion 2100, an internal database analysis portion 2200, and a system interface portion 2300. The computing system 2000 may include other elements not shown in FIG. 2, such as computer network elements.

The external data source portion 2100 may be associated with, such as controlled by, an external person, entity, or organization (second party). The internal database analysis portion 2200 may be associated with, such as created by or controlled by, a person, entity, or organization (first party). The system interface portion 2300 may be associated with, such as created by or controlled by, the first party and may be accessed by the first party, the second party, third parties, or a combination thereof, such as in accordance with access and authorization permissions and procedures.

The external data source portion 2100 is shown as including external database servers 2120 and external application servers 2140. The external data source portion 2100 may include other elements not shown in FIG. 2. The external data source portion 2100 may include external computing devices, such as the computing device 1000 shown in FIG. 1, which may be used by or accessible to the external person, entity, or organization (second party) associated with the external data source portion 2100, including but not limited to external database servers 2120 and external application servers 2140. The external computing devices may include data regarding the operation of the external person, entity, or organization (second party) associated with the external data source portion 2100.

The external database servers 2120 may be one or more computing devices configured to store data in a format and schema determined externally from the internal database analysis portion 2200, such as by a second party associated with the external data source portion 2100, or a third party. For example, the external database server 2120 may use a relational database and may include a database catalog with a schema. In some embodiments, the external database server 2120 may include a non-database data storage structure, such as a text-based data structure, such as a comma separated variable structure or an extensible markup language formatted structure or file. For example, the external database servers 2120 can include data regarding the production of materials by the external person, entity, or organization (second party) associated with the external data source portion 2100, communications between the external person, entity, or organization (second party) associated with the external data source portion 2100 and third parties, or a combination thereof. Other data may be included. The external database may be a structured database system, such as a relational database operating in a relational database management system (RDBMS), which may be an enterprise database. In some embodiments, the external database may be an unstructured data source. The external data may include data or content, such as sales data, revenue data, profit data, tax data, shipping data, safety data, sports data, health data, meteorological data, or the like, or any other data, or combination of data, that may be generated by or associated with a user, an organization, or an enterprise and stored in a database system. For simplicity and clarity, data stored in or received from the external data source portion 2100 may be referred to herein as enterprise data.

The external application server 2140 may include application software, such as application software used by the external person, entity, or organization (second party) associated with the external data source portion 2100. The external application server 2140 may include data or metadata relating to the application software.

The external database servers 2120, the external application servers 2140, or both, shown in FIG. 2 may represent logical units or devices that may be implemented on one or more physical units or devices, which may be controlled or operated by the first party, the second party, or a third party.

The external data source portion 2100, or aspects thereof, such as the external database servers 2120, the external application servers 2140, or both, may communicate with the internal database analysis portion 2200, or an aspect thereof, such as one or more of the servers 2220, 2240, 2260, and 2280, via an electronic communication medium, which may be a wired or wireless electronic communication medium. For example, the electronic communication medium may include a local area network (LAN), a wide area network (WAN), a fiber channel network, the Internet, or a combination thereof.

The internal database analysis portion 2200 is shown as including servers 2220, 2240, 2260, and 2280. The servers 2220, 2240, 2260, and 2280 may be computing devices, such as the computing device 1000 shown in FIG. 1. Although four servers 2220, 2240, 2260, and 2280 are shown in FIG. 2, other numbers, or cardinalities, of servers may be used. For example, the number of computing devices may be determined based on the capability of individual computing devices, the amount of data to be processed, the complexity of the data to be processed, or a combination thereof. Other metrics may be used for determining the number of computing devices.

The internal database analysis portion 2200 may store data, process data, or store and process data. The internal database analysis portion 2200 may include a distributed cluster (not expressly shown) which may include two or more of the servers 2220, 2240, 2260, and 2280. The operation of distributed cluster, such as the operation of the servers 2220, 2240, 2260, and 2280 individually, in combination, or both, may be managed by a distributed cluster manager. For example, the server 2220 may be the distributed cluster manager. In another example, the distributed cluster manager may be implemented on another computing device (not shown). The data and processing of the distributed cluster may be distributed among the servers 2220, 2240, 2260, and 2280, such as by the distributed cluster manager.

Enterprise data from the external data source portion 2100, such as from the external database server 2120, the external application server 2140, or both may be imported into the internal database analysis portion 2200. The external database server 2120, the external application server 2140, or both may be one or more computing devices and may communicate with the internal database analysis portion 2200 via electronic communication. The imported data may be distributed among, processed by, stored on, or a combination thereof, one or more of the servers 2220, 2240, 2260, and 2280. Importing the enterprise data may include importing or accessing the data structures of the enterprise data.

Importing the enterprise data may include generating internal data, internal data structures, or both, based on the enterprise data. The internal data, internal data structures, or both may accurately represent and may differ from the enterprise data, the data structures of the enterprise data, or both. In some implementations, enterprise data from multiple external data sources may be imported into the internal database analysis portion 2200. For simplicity and clarity, data stored or used in the internal database analysis portion 2200 may be referred to herein as internal data. For example, the internal data, or a portion thereof, may represent, and may be distinct from, enterprise data imported into or accessed by the internal database analysis portion 2200.

The system interface portion 2300 may include one or more client devices 2320, 2340. The client devices 2320, 2340 may be computing devices, such as the computing device 1000 shown in FIG. 1. For example, one of the client devices 2320, 2340 may be a desktop or laptop computer and the other of the client devices 2320, 2340 may be a mobile device, smartphone, or tablet. One or more of the client devices 2320, 2340 may access the internal database analysis portion 2200. For example, the internal database analysis portion 2200 may provide one or more services, application interfaces, or other electronic computer communication interfaces, such as a web site, and the client devices 2320, 2340 may access the interfaces provided by the internal database analysis portion 2200, which may include accessing the internal data stored in the internal database analysis portion 2200.

In an example, one or more of the client devices 2320, 2340 may send a message or signal indicating a request for data, which may include a request for data analysis, to the internal database analysis portion 2200. The internal database analysis portion 2200 may receive and process the request, which may include distributing the processing among one or more of the servers 2220, 2240, 2260, and 2280, may generate a response to the request, which may include generating or modifying internal data, internal data structures, or both, and may output the response to the client device 2320, 2340 that sent the request. Processing the request may include accessing one or more internal data indexes, an internal database, or a combination thereof. The client device 2320, 2340 may receive the response, including the response data or a portion thereof, and may store, output, or both, the response, or a representation thereof, such as a representation of the response data, or a portion thereof, which may include presenting the representation via a user interface on a presentation device of the client device 2320, 2340, such as to a user of the client device 2320, 2340.

The system interface portion 2300, or aspects thereof, such as one or more of the client devices 2320, 2340, may communicate with the internal database analysis portion 2200, or an aspect thereof, such as one or more of the servers 2220, 2240, 2260, and 2280, via an electronic communication medium, which may be a wired or wireless electronic communication medium. For example, the electronic communication medium may include a local area network (LAN), a wide area network (WAN), a fiber channel network, the Internet, or a combination thereof.

Figure 3:
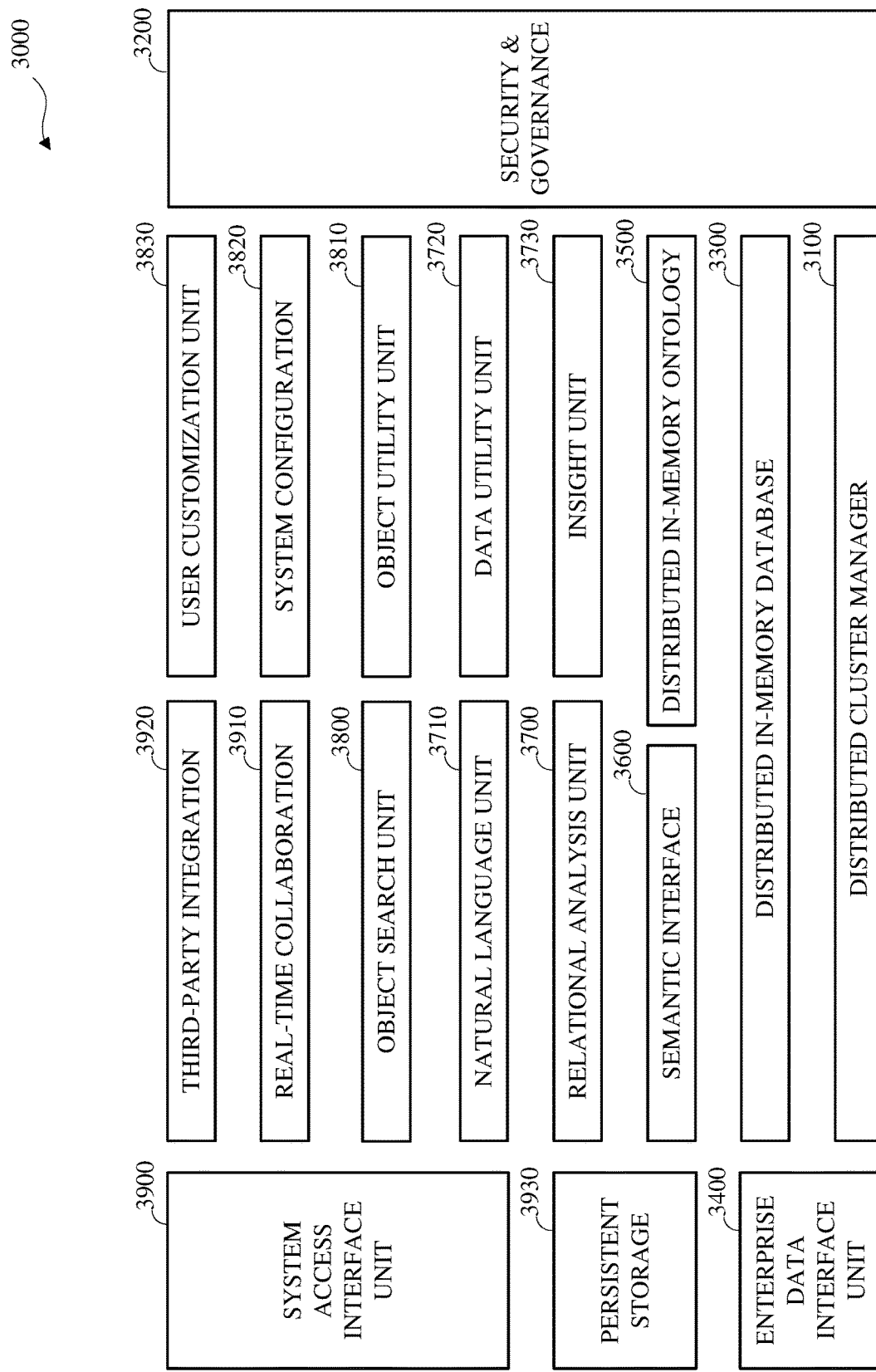
FIG. 3 is a block diagram of an example of a low-latency data access and analysis system.

FIG. 3 is a block diagram of an example of a low-latency data access and analysis system 3000. The low-latency data access and analysis system 3000, or aspects thereof, may be similar to the internal database analysis portion 2200 shown in FIG. 2, except as described herein or otherwise clear from context. The low-latency data access and analysis system 3000, or aspects thereof, may be implemented on one or more computing devices, such as servers 2220, 2240, 2260, and 2280 shown in FIG. 2, which may be in a clustered or distributed computing configuration. As used herein, the terms "low-latency data access and analysis system," "low-latency data analysis system," and "low-latency database analysis system" indicate a computer implemented system, such as the low-latency data access and analysis system 3000 shown in FIG. 3, that obtains, stores, organizes, processes, automatically analyzes, and outputs data and visualizations thereof.

The low-latency data access and analysis system 3000, which may be a low-latency database analysis system, may store and maintain the internal data, or a portion thereof, such as low-latency data, in a low-latency memory device, such as the low-latency memory 1300 shown in FIG. 1, or any other type of data storage medium or combination of data storage devices with relatively fast (low-latency) data access, organized in a low-latency data structure. In some embodiments, the low-latency data access and analysis system 3000 may be implemented as one or more logical devices in a cloud-based configuration optimized for automatic database analysis.

As shown, the low-latency data access and analysis system 3000 includes a distributed cluster manager 3100, a security and governance unit 3200, a distributed in-memory database 3300, an enterprise data interface unit 3400, a distributed in-memory ontology unit 3500, a semantic interface unit 3600, a relational analysis unit 3700, a natural language processing unit 3710, a data utility unit 3720, an insight unit 3730, an object search unit 3800, an object utility unit 3810, a system configuration unit 3820, a user customization unit 3830, a system access interface unit 3900, a real-time collaboration unit 3910, a third-party integration unit 3920, and a persistent storage unit 3930, which may be collectively referred to as the components of the low-latency data access and analysis system 3000.

Although not expressly shown in FIG. 3, one or more of the components of the low-latency data access and analysis system 3000 may be implemented on one or more operatively connected physical or logical computing devices, such as in a distributed cluster computing configuration, such as the internal database analysis portion 2200 shown in FIG. 2. Although shown separately in FIG. 3, one or more of the components of the low-latency data access and analysis system 3000, or respective aspects thereof, may be combined or otherwise organized.

The low-latency data access and analysis system 3000 may include different, fewer, or additional components not shown in FIG. 3. The aspects or components implemented in an instance of the low-latency data access and analysis system 3000 may be configurable. For example, the insight unit 3730 may be omitted or disabled. One or more of the components of the low-latency data access and analysis system 3000 may be implemented in a manner such that aspects thereof are divided or combined into various executable modules or libraries in a manner which may differ from that described herein.

The low-latency data access and analysis system 3000 may implement an application programming interface (API), which may monitor, receive, or both, input signals or messages from external devices and systems, client systems, process received signals or messages, transmit corresponding signals or messages to one or more of the components of the low-latency data access and analysis system 3000, and output, such as transmit or send, output messages or signals to respective external devices or systems. The low-latency data access and analysis system 3000 may be implemented in a distributed computing configuration.

The distributed cluster manager 3100 manages the operative configuration of the low-latency data access and analysis system 3000. Managing the operative configuration of the low-latency data access and analysis system 3000 may include controlling the implementation of and distribution of processing and storage across one or more logical devices operating on one or more physical devices, such as the servers 2220, 2240, 2260, and 2280 shown in FIG. 2. The distributed cluster manager 3100 may generate and maintain configuration data for the low-latency data access and analysis system 3000, such as in one or more tables, identifying the operative configuration of the low-latency data access and analysis system 3000. For example, the distributed cluster manager 3100 may automatically update the low-latency data access and analysis system configuration data in response to an operative configuration event, such as a change in availability or performance for a physical or logical unit of the low-latency data access and analysis system 3000. One or more of the component units of low-latency data access and analysis system 3000 may access the data analysis system configuration data, such as to identify intercommunication parameters or paths.

The security and governance unit 3200 may describe, implement, enforce, or a combination thereof, rules and procedures for controlling access to aspects of the low-latency data access and analysis system 3000, such as the internal data of the low-latency data access and analysis system 3000 and the features and interfaces of the low-latency data access and analysis system 3000. The security and governance unit 3200 may apply security at an ontological level to control or limit access to the internal data of the low-latency data access and analysis system 3000, such as to columns, tables, rows, or fields, which may include using row-level security.

Although shown as a single unit in FIG. 3, the distributed in-memory database 3300 may be implemented in a distributed configuration, such as distributed among the servers 2220, 2240, 2260, and 2280 shown in FIG. 2, which may include multiple in-memory database instances. Each in-memory database instance may utilize one or more distinct resources, such as processing or low-latency memory resources, that differ from the resources utilized by the other in-memory database instances. In some embodiments, the in-memory database instances may utilize one or more shared resources, such as resources utilized by two or more in-memory database instances.

The distributed in-memory database 3300 may generate, maintain, or both, a low-latency data structure and data stored or maintained therein (low-latency data). The low-latency data may include principal data, which may represent enterprise data, such as enterprise data imported from an external enterprise data source, such as the external data source portion 2100 shown in FIG. 2. In some implementations, the distributed in-memory database 3300 may include system internal data representing one or more aspects, features, or configurations of the low-latency data access and analysis system 3000. The distributed in-memory database 3300 and the low-latency data stored therein, or a portion thereof, may be accessed using commands, messages, or signals in accordance with a defined structured query language associated with, such as implemented by, the distributed in-memory database 3300.

The low-latency data, or a portion thereof, may be organized as tables in the distributed in-memory database 3300. A table may be a data structure to organize or group the data or a portion thereof, such as related or similar data. A table may have a defined structure. For example, each table may define or describe a respective set of one or more columns.

A column may define or describe the characteristics of a discrete aspect of the data in the table. For example, the definition or description of a column may include an identifier, such as a name, for the column within the table, and one or more constraints, such as a data type, for the data corresponding to the column in the table. The definition or description of a column may include other information, such as a description of the column. The data in a table may be accessible or partitionable on a per-column basis. The set of tables, including the column definitions therein, and information describing relationships between elements, such as tables and columns, of the database may be defined or described by a database schema or design. The cardinality of columns of a table, and the definition and organization of the columns, may be defined by the database schema or design. Adding, deleting, or modifying a table, a column, the definition thereof, or a relationship or constraint thereon, may be a modification of the database design, schema, model, or structure.

The low-latency data, or a portion thereof, may be stored in the database as one or more rows or records in respective tables. Each record or row of a table may include a respective field or cell corresponding to each column of the table. A field may store a discrete data value. The cardinality of rows of a table, and the values stored therein, may be variable based on the data. Adding, deleting, or modifying rows, or the data stored therein may omit modification of the database design, schema, or structure. The data stored in respective columns may be identified or defined as a measure data, attribute data, or enterprise ontology data (e.g., metadata).

Measure data, or measure values, may include quantifiable or additive numeric values, such as integer or floating-point values, which may include numeric values indicating sizes, amounts, degrees, or the like. A column defined as representing measure values may be referred to herein as a measure or fact. A measure may be a property on which quantitative operations (e.g., sum, count, average, minimum, maximum) may be performed to calculate or determine a result or output.

Attribute data, or attribute values, may include non-quantifiable values, such as text or image data, which may indicate names and descriptions, quantifiable values designated, defined, or identified as attribute data, such as numeric unit identifiers, or a combination thereof. A column defined as including attribute values may be referred to herein as an attribute or dimension. For example, attributes may include text, identifiers, timestamps, or the like.

Enterprise ontology data may include data that defines or describes one or more aspects of the database, such as data that describes one or more aspects of the attributes, measures, rows, columns, tables, relationships, or other aspects of the data or database schema. For example, a portion of the database design, model, or schema may be represented as enterprise ontology data in one or more tables in the database.

Distinctly identifiable data in the low-latency data may be referred to herein as a data portion. For example, the low-latency data stored in the distributed in-memory database 3300 may be referred to herein as a data portion, a table from the low-latency data may be referred to herein as a data portion, a column from the low-latency data may be referred to herein as a data portion, a row or record from the low-latency data may be referred to herein as a data portion, a value from the low-latency data may be referred to herein as a data portion, a relationship defined in the low-latency data may be referred to herein as a data portion, enterprise ontology data describing the low-latency data may be referred to herein as a data portion, or any other distinctly identifiable data, or combination thereof, from the low-latency data may be referred to herein as a data portion.

The distributed in-memory database 3300 may create or add one or more data portions, such as a table, may read from or access one or more data portions, may update or modify one or more data portions, may remove or delete one or more data portions, or a combination thereof. Adding, modifying, or removing data portions may include changes to the data model of the low-latency data. Changing the data model of the low-latency data may include notifying one or more other components of the low-latency data access and analysis system 3000, such as by sending, or otherwise making available, a message or signal indicating the change. For example, the distributed in-memory database 3300 may create or add a table to the low-latency data and may transmit or send a message or signal indicating the change to the semantic interface unit 3600.

In some implementations, a portion of the low-latency data may represent a data model of an external enterprise database and may omit the data stored in the external enterprise database, or a portion thereof. For example, prioritized data may be cached in the distributed in-memory database 3300 and the other data may be omitted from storage in the distributed in-memory database 3300, which may be stored in the external enterprise database. In some implementations, requesting data from the distributed in-memory database 3300 may include requesting the data, or a portion thereof, from the external enterprise database.

The distributed in-memory database 3300 may receive one or more messages or signals indicating respective data-queries for the low-latency data, or a portion thereof, which may include data-queries for modified, generated, or aggregated data generated based on the low-latency data, or a portion thereof. For example, the distributed in-memory database 3300 may receive a data-query from the semantic interface unit 3600, such as in accordance with a request for data. The data-queries received by the distributed in-memory database 3300 may be agnostic to the distributed configuration of the distributed in-memory database 3300. A data-query, or a portion thereof, may be expressed in accordance with the defined structured query language implemented by the distributed in-memory database 3300. In some implementations, a data-query, or a portion thereof, may be expressed in accordance with a defined structured query language implemented by a defined database other than the distributed in-memory database 3300, such as an external database. In some implementations, a data-query may be included, such as stored or communicated, in a data-query data structure or container.

The distributed in-memory database 3300 may execute or perform one or more queries to generate or obtain response data responsive to the data-query based on the low-latency data. Unless expressly described, or otherwise clear from context, descriptions herein of a table in the context of performing, processing, or executing a data-query that include accessing, such as reading, writing, or otherwise using, a table, or data from a table, may refer to a table stored, or otherwise maintained, in the distributed in-memory database independently of the data-query or may refer to tabular data obtained, such as generated, in accordance with the data-query.

The distributed in-memory database 3300 may interpret, evaluate, or otherwise process a data-query to generate one or more distributed-queries, which may be expressed in accordance with the defined structured query language. For example, an in-memory database instance of the distributed in-memory database 3300 may be identified as a query coordinator. The query coordinator may generate a query plan, which may include generating one or more distributed-queries, based on the received data-query. The query plan may include query execution instructions for executing one or more queries, or one or more portions thereof, based on the received data-query by the one or more of the in-memory database instances. Generating the query plan may include optimizing the query plan. The query coordinator may distribute, or otherwise make available, the respective portions of the query plan, as query execution instructions, to the corresponding in-memory database instances.

The respective in-memory database instances may receive the corresponding query execution instructions from the query coordinator. The respective in-memory database instances may execute the corresponding query execution instructions to obtain, process, or both, data (intermediate results data) from the low-latency data. The respective in-memory database instances may output, or otherwise make available, the intermediate results data, such as to the query coordinator.

The query coordinator may execute a respective portion of query execution instructions (allocated to the query coordinator) to obtain, process, or both, data (intermediate results data) from the low-latency data. The query coordinator may receive, or otherwise access, the intermediate results data from the respective in-memory database instances. The query coordinator may combine, aggregate, or otherwise process, the intermediate results data to obtain results data.

In some embodiments, obtaining the intermediate results data by one or more of the in-memory database instances may include outputting the intermediate results data to, or obtaining intermediate results data from, one or more other in-memory database instances, in addition to, or instead of, obtaining the intermediate results data from the low-latency data.

The distributed in-memory database 3300 may output, or otherwise make available, the results data to the semantic interface unit 3600.

The enterprise data interface unit 3400 may interface with, or communicate with, an external enterprise data system. For example, the enterprise data interface unit 3400 may receive or access enterprise data from or in an external system, such as an external database. The enterprise data interface unit 3400 may import, evaluate, or otherwise process the enterprise data to populate, create, or modify data stored in the low-latency data access and analysis system 3000. The enterprise data interface unit 3400 may receive, or otherwise access, the enterprise data from one or more external data sources, such as the external data source portion 2100 shown in FIG. 2, and may represent the enterprise data in the low-latency data access and analysis system 3000 by importing, loading, or populating the enterprise data as principal data in the distributed in-memory database 3300, such as in one or more low-latency data structures. The enterprise data interface unit 3400 may implement one or more data connectors, which may transfer data between, for example, the external data source and the distributed in-memory database 3300, which may include altering, formatting, evaluating, or manipulating the data.

The enterprise data interface unit 3400 may receive, access, or generate metadata that identifies one or more parameters or relationships for the principal data, such as based on the enterprise data, and may include the generated metadata in the low-latency data stored in the distributed in-memory database 3300. For example, the enterprise data interface unit 3400 may identify characteristics of the principal data such as, attributes, measures, values, unique identifiers, tags, links, keys, or the like, and may include metadata representing the identified characteristics in the low-latency data stored in the distributed in-memory database 3300. The characteristics of the data can be automatically determined by receiving, accessing, processing, evaluating, or interpreting the schema in which the enterprise data is stored, which may include automatically identifying links or relationships between columns, classifying columns (e.g., using column names), and analyzing or evaluating the data.

Although not shown separately in FIG. 3, the low-latency data access and analysis system 3000 implements a canonical, or system-defined, chronometry. The system-defined chronometry defines the measurement, storage, processing, organization, scale, expression, and representation of time and temporal data in the low-latency database analysis system 3000. For example, the system-defined chronometry may correspond with a Gregorian calendar, or a defined variant thereof. The system-defined chronometry defines one or more chronometric units, which may be nominal, or named, representations of respective temporal intervals. A reference chronometric unit, such as a 'second' chronometric unit, may represent a minimal temporal interval in the low-latency database analysis system. One or more aspects of the system-defined chronometry may be defined by the operating environment of the low-latency database analysis system, such as by a hardware component, an operating system, or a combination thereof. For example, a hardware component, such as a system clock (clock circuit) may define the temporal interval of the reference chronometric unit and an operating system may define one or more other chronometric units with reference to the reference chronometric unit.

The low-latency database analysis system 3000 may define or describe one or more chronometric unit types, such as a 'minute' chronometric unit type, an 'hour' chronometric unit type, a 'day' chronometric unit type, a 'week' chronometric unit type, a 'month' chronometric unit type, a 'quarter' chronometric unit type, a 'year' chronometric unit type, or any other type of chronometric unit. A temporal point may be represented, such as stored or processed, in the low-latency database analysis system as an epoch value, which may be an integer value, such that each temporal point from the contiguous sequence of temporal points that comprises the temporal continuum corresponds with a respective epoch value. A temporal location may be represented in the low-latency database analysis system as an epoch value and may be expressed in the low-latency database analysis system using one or more chronometric units, or respective values thereof. The system-defined chronometry defines respective descriptors, such as a day-of-week-name, month-name, and the like. Data defining or describing the system-defined chronometry may be stored in the low-latency data access and analysis system as a chronometric dataset. In some implementations, the low-latency data access and analysis system may define or describe a domain-specific chronometry that differs from the system-defined chronometry. The chronometric units defined or described by the domain-specific chronometry, except for the reference chronometric unit, may differ from the chronometric units defined or described by the system-defined chronometry. Data defining or describing the domain-specific chronometry may be stored in the low-latency data access and analysis system as a chronometric dataset.

Distinctly identifiable operative data units or structures representing one or more data portions, one or more entities, users, groups, or organizations represented in the internal data, or one or more aggregations, collections, relations, analytical results, visualizations, or groupings thereof, may be represented in the low-latency data access and analysis system 3000 as objects. An object may include a unique identifier for the object, such as a fully qualified name. An object may include a name, such as a displayable value, for the object.

For example, an object may represent a user, a group, an entity, an organization, a privilege, a role, a table, a column, a data relationship, a worksheet, a view, an access context, an answer, an insight, a pinboard, a tag, a comment, a trigger, a defined variable, a data source, an object-level security rule, a row-level security rule, or any other data capable of being distinctly identified and stored or otherwise obtained in the low-latency data access and analysis system 3000. An object may represent or correspond with a logical entity. Data describing an object may include data operatively or uniquely identifying data corresponding to, or represented by, the object in the low-latency data access and analysis system. For example, a column in a table in a database in the low-latency data access and analysis system may be represented in the low-latency data access and analysis system as an object and the data describing or defining the object may include data operatively or uniquely identifying the column.

A worksheet (worksheet object), or worksheet table, may be a logical table, or a definition thereof, which may be a collection, a sub-set (such as a subset of columns from one or more tables), or both, of data from one or more data sources, such as columns in one or more tables, such as in the distributed in-memory database 3300. A worksheet, or a definition thereof, may include one or more data organization or manipulation definitions, such as join paths or worksheet-column definitions, which may be user defined. A worksheet may be a data structure that may contain one or more rules or definitions that may define or describe how a respective tabular set of data may be obtained, which may include defining one or more sources of data, such as one or more columns from the distributed in-memory database 3300. A worksheet may be a data source. For example, a worksheet may include references to one or more data sources, such as columns in one or more tables, such as in the distributed in-memory database 3300, and a request for data referencing the worksheet may access the data from the data sources referenced in the worksheet. In some implementations, a worksheet may omit aggregations of the data from the data sources referenced in the worksheet.

An answer (answer object), or report, may represent a defined, such as previously generated, request for data, such as a resolved request. An answer may include information describing a visualization of data responsive to the request for data.

A visualization (visualization object) may be a defined representation or expression of data, such as a visual representation of the data, for presentation to a user or human observer, such as via a user interface. Although described as a visual representation, in some implementations, a visualization may include non-visual aspects, such as auditory or haptic presentation aspects. A visualization may be generated to represent a defined set of data in accordance with a defined visualization type or template (visualization template object), such as in a chart, graph, or tabular form. Example visualization types may include, and are not limited to, chloropleths, cartograms, dot distribution maps, proportional symbol maps, contour/isopleth/isarithmic maps, daysymetric map, self-organizing map, timeline, time series, connected scatter plots, Gantt charts, steam graph/theme river, arc diagrams, polar area/rose/circumplex charts, Sankey diagrams, alluvial diagrams, pie charts, histograms, tag clouds, bubble charts, bubble clouds, bar charts, radial bar charts, tree maps, scatter plots, line charts, step charts, area charts, stacked graphs, heat maps, parallel coordinates, spider charts, box and whisker plots, mosaic displays, waterfall charts, funnel charts, or radial tree maps. A visualization template may define or describe one or more visualization parameters, such as one or more color parameters. Visualization data for a visualization may include values of one or more of the visualization parameters of the corresponding visualization template.

A view (view object) may be a logical table, or a definition thereof, which may be a collection, a sub-set, or both, of data from one or more data sources, such as columns in one or more tables, such as in the distributed in-memory database 3300. For example, a view may be generated based on an answer, such as by storing the answer as a view. A view may define or describe a data aggregation. A view may be a data source. For example, a view may include references to one or more data sources, such as columns in one or more tables, such as in the distributed in-memory database 3300, which may include a definition or description of an aggregation of the data from a respective data source, and a request for data referencing the view may access the aggregated data, the data from the unaggregated data sources referenced in the worksheet, or a combination thereof. The unaggregated data from data sources referenced in the view defined or described as aggregated data in the view may be unavailable based on the view. A view may be a materialized view or an unmaterialized view. A request for data referencing a materialized view may obtain data from a set of data previously obtained (view-materialization) in accordance with the definition of the view and the request for data. A request for data referencing an unmaterialized view may obtain data from a set of data currently obtained in accordance with the definition of the view and the request for data.

A pinboard (pinboard object), or dashboard, may be a defined collection or grouping of objects, such as visualizations, answers, or insights. Pinboard data for a pinboard may include information associated with the pinboard, which may be associated with respective objects included in the pinboard.

An access context (access-context object) may be a set or collection of data associated with, such as including, data expressing usage intent, such as a request for data, data responsive to data expressing usage intent, or a discretely related sequence or series of requests for data or other interactions with the low-latency data access and analysis system 3000, and a corresponding data structure for containing such data. For example, data expressing usage intent may be generated by the low-latency data access and analysis system 3000, or a component thereof, such as the system access interface unit 3900, such as in response to input, such as user input, obtained by the low-latency data access and analysis system 3000. In another example, data expressing usage intent may be obtained, received, or otherwise accessed, by the low-latency data access and analysis system 3000, or a component thereof, from an external device or system.

A definition may be a set of data describing the structure or organization of a data portion. For example, in the distributed in-memory database 3300, a column definition may define one or more aspects of a column in a table, such as a name of the column, a description of the column, a datatype for the column, or any other information about the column that may be represented as discrete data.

A data source object may represent a source or repository of data accessible by the low-latency data access and analysis system 3000. A data source object may include data indicating an electronic communication location, such as an address, of a data source, connection information, such as protocol information, authentication information, or a combination thereof, or any other information about the data source that may be represented as discrete data. For example, a data source object may represent a table in the distributed in-memory database 3300 and include data for accessing the table from the database, such as information identifying the database, information identifying a schema within the database, and information identifying the table within the schema within the database. A data source object (external data source object) may represent an external data source. For example, an external data source object may include data indicating an electronic communication location, such as an address, of an external data source, connection information, such as protocol information, authentication information, or a combination thereof, or any other information about the external data source that may be represented as discrete data.

A sticker (sticker object) may be a description of a classification, category, tag, subject area, or other information that may be associated with one or more other objects such that objects associated with a sticker may be grouped, sorted, filtered, or otherwise identified based on the sticker. In the distributed in-memory database 3300 a tag may be a discrete data portion that may be associated with other data portions, such that data portions associated with a tag may be grouped, sorted, filtered, or otherwise identified based on the tag.

The distributed in-memory ontology unit 3500 generates, maintains, or both, information (ontological data) defining or describing the operative ontological structure of the objects represented in the low-latency data access and analysis system 3000, such as in the low-latency data stored in the distributed in-memory database 3300, which may include describing attributes, properties, states, or other information about respective objects and may include describing relationships among respective objects.

Objects may be referred to herein as primary objects, secondary objects, or tertiary objects. Other types of objects may be used.

Primary objects may include objects representing distinctly identifiable operative data units or structures representing one or more data portions in the distributed in-memory database 3300, or another data source in the low-latency data access and analysis system 3000. For example, primary objects may be data source objects, table objects, column objects, relationship objects, or the like. Primary objects may include worksheets, views, filters, such as row-level-security filters and table filters, variables, or the like. Primary objects may be referred to herein as data-objects or queryable-objects.

Secondary objects may be objects representing distinctly identifiable operative data units or structures representing analytical data aggregations, collections, analytical results, visualizations, or groupings thereof, such as pinboard objects, answer objects, insights, visualization objects, resolved-request objects, and the like. Secondary objects may be referred to herein as analytical objects.

Tertiary objects may be objects representing distinctly identifiable operative data units or structures representing operational aspects of the low-latency data access and analysis system 3000, such as one or more entities, users, groups, or organizations represented in the internal data, such as user objects, user-group objects, role objects, sticker objects, and the like.

The distributed in-memory ontology unit 3500 may represent the ontological structure, which may include the objects therein, as a graph having nodes and edges. A node may be a representation of an object in the graph structure of the distributed in-memory ontology unit 3500. A node, representing an object, can include one or more components. The components of a node may be versioned, such as on a per-component basis. For example, a node can include a header component, a content component, or both. A header component may include information about the node. A content component may include the content of the node. An edge may represent a relationship between nodes, which may be directional.

In some implementations, the distributed in-memory ontology unit 3500 graph may include one or more nodes, edges, or both, representing one or more objects, relationships or both, corresponding to a respective internal representation of enterprise data stored in an external enterprise data storage unit, wherein a portion of the data stored in the external enterprise data storage unit represented in the distributed in-memory ontology unit 3500 graph is omitted from the distributed in-memory database 3300.

In some embodiments, the distributed in-memory ontology unit 3500 may generate, modify, or remove a portion of the ontology graph in response to one or more messages, signals, or notifications from one or more of the components of the low-latency data access and analysis system 3000. For example, the distributed in-memory ontology unit 3500 may generate, modify, or remove a portion of the ontology graph in response to receiving one or more messages, signals, or notifications from the distributed in-memory database 3300 indicating a change to the low-latency data structure. In another example, the distributed in-memory database 3300 may send one or more messages, signals, or notifications indicating a change to the low-latency data structure to the semantic interface unit 3600 and the semantic interface unit 3600 may send one or more messages, signals, or notifications indicating the change to the low-latency data structure to the distributed in-memory ontology unit 3500.

The distributed in-memory ontology unit 3500 may be distributed, in-memory, multi-versioned, transactional, consistent, durable, or a combination thereof. The distributed in-memory ontology unit 3500 is transactional, which may include implementing atomic concurrent, or substantially concurrent, updating of multiple objects. The distributed in-memory ontology unit 3500 is durable, which may include implementing a robust storage that prevents data loss subsequent to or as a result of the completion of an atomic operation. The distributed in-memory ontology unit 3500 is consistent, which may include performing operations associated with a request for data with reference to or using a discrete data set, which may mitigate or eliminate the risk inconsistent results.

The distributed in-memory ontology unit 3500 may generate, output, or both, one or more event notifications. For example, the distributed in-memory ontology unit 3500 may generate, output, or both, a notification or notifications, in response to a change of the distributed in-memory ontology. The distributed in-memory ontology unit 3500 may identify a portion of the distributed in-memory ontology (graph)

associated with a change of the distributed in-memory ontology, such as one or more nodes depending from a changed node, and may generate, output, or both, a notification, or notifications indicating the identified relevant portion of the distributed in-memory ontology (graph). One or more aspects of the low-latency data access and analysis system 3000 may cache object data and may receive the notifications from the distributed in-memory ontology unit 3500, which may reduce latency and network traffic relative to systems that omit caching object data or omit notifications relevant to changes to portions of the distributed in-memory ontology (graph).

The distributed in-memory ontology unit 3500 may implement prefetching. For example, the distributed in-memory ontology unit 3500 may predictively, such as based on determined probabilistic utility, fetch one or more nodes, such as in response to access to a related node by a component of the low-latency data access and analysis system 3000.

The distributed in-memory ontology unit 3500 may implement a multi-version concurrency control graph data storage unit. Each node, object, or both, may be versioned. Changes to the distributed in-memory ontology may be reversible. For example, the distributed in-memory ontology may have a first state prior to a change to the distributed in-memory ontology, the distributed in-memory ontology may have a second state subsequent to the change, and the state of the distributed in-memory ontology may be reverted to the first state subsequent to the change, such as in response to the identification of an error or failure associated with the second state.

In some implementations, reverting a node, or a set of nodes, may omit reverting one or more other nodes. In some implementations, the distributed in-memory ontology unit 3500 may maintain a change log indicating a sequential record of changes to the distributed in-memory ontology (graph), such that a change to a node or a set of nodes may be reverted and one or more other changes subsequent to the reverted change may be reverted for consistency.

The distributed in-memory ontology unit 3500 may implement optimistic locking to reduce lock contention times. The use of optimistic locking permits improved throughput of data through the distributed in-memory ontology unit 3500.

The semantic interface unit 3600 may implement procedures and functions to provide a semantic interface between the distributed in-memory database 3300 and one or more of the other components of the low-latency data access and analysis system 3000.

The semantic interface unit 3600 may implement ontological data management, data-query generation, authentication and access control, object statistical data collection, or a combination thereof.

Ontological data management may include object lifecycle management, object data persistence, ontological modifications, or the like. Object lifecycle management may include creating one or more objects, reading or otherwise accessing one or more objects, updating or modifying one or more objects, deleting or removing one or more objects, or a combination thereof. For example, the semantic interface unit 3600 may interface or communicate with the distributed in-memory ontology unit 3500, which may store the ontological data, object data, or both, to perform object lifecycle management, object data persistence, ontological modifications, or the like.

For example, the semantic interface unit 3600 may receive, or otherwise access, a message, signal, or notification, such as from the distributed in-memory database 3300, indicating the creation or addition of a data portion, such as a table, in the low-latency data stored in the distributed in-memory database 3300, and the semantic interface unit 3600 may communicate with the distributed in-memory ontology unit 3500 to create an object in the ontology representing the added data portion. The semantic interface unit 3600 may transmit, send, or otherwise make available, a notification, message, or signal to the relational analysis unit 3700 indicating that the ontology has changed.

The semantic interface unit 3600 may receive, or otherwise access, a request message or signal, such as from the relational analysis unit 3700, indicating a request for information describing changes to the ontology (ontological updates request). The semantic interface unit 3600 may generate and send, or otherwise make available, a response message or signal to the relational analysis unit 3700 indicating the changes to the ontology (ontological updates response). The semantic interface unit 3600 may identify one or more data portions for indexing based on the changes to the ontology. For example, the changes to the ontology may include adding a table to the ontology, the table including multiple rows, and the semantic interface unit 3600 may identify each row as a data portion for indexing. The semantic interface unit 3600 may include information describing the ontological changes in the ontological updates response. The semantic interface unit 3600 may include one or more data-query definitions, such as data-query definitions for indexing data-queries, for each data portion identified for indexing in the ontological updates response. For example, the data-query definitions may include a sampling data-query, which may be used to query the distributed in-memory database 3300 for sample data from the added data portion, an indexing data-query, which may be used to query the distributed in-memory database 3300 for data from the added data portion, or both.

The semantic interface unit 3600 may receive, or otherwise access, internal signals or messages including data expressing usage intent, such as data indicating requests to access or modify the low-latency data stored in the distributed in-memory database 3300 (e.g., a request for data). The request to access or modify the low-latency data received by the semantic interface unit 3600 may include a resolved request (resolved-request data), such as in a resolved-request object, such as a resolved-request object generated by the relational analysis unit 3700. The resolved request data, which may be database and visualization agnostic, may be expressed or communicated as an ordered sequence of tokens, which may represent semantic data.

The resolved-request data may include tokenization binding data. The tokenization binding data corresponding to a respective token may include, for example, one or more of a column identifier indicating a column corresponding to the respective token, a data type identifier corresponding to the respective token, a table identifier indicating a table corresponding to the respective token, an indication of an aggregation corresponding to the respective token, or an indication of a join path associated with the respective token. Other tokenization binding data may be used.

The resolved-request data may include phrasing data indicating phrasing with respect to the sequence of tokens in the resolved request, wherein tokens, such as one or more sequential tokens, are included in a respective phrase, which may be referred to as a search and analysis phrase. The phrasing data may include phrase type data for respective phrases. For some tokens, or sequences of tokens, the phrasing data may indicate that the sequence of tokens corresponds with a value stored in a data source, such as in a column in a table, wherein the phrasing data includes data uniquely identifying the data source, such as a column identifier.

A token is a unit of data in the low-latency data access and analysis system 3000 that represents, in accordance with one or more defined grammars implemented by the low-latency data access and analysis system 3000, a data portion accessed by or stored in the low-latency data access and analysis system 3000, an operation of the low-latency data access and analysis system 3000, an object represented in the low-latency data access and analysis system 3000, or a class or type of data portion, operation, or object in the low-latency data access and analysis system 3000. A token may be a value (token value), such as a string value, which may be a word, a character, a sequence of characters, a symbol, a combination of symbols, or the like. In some implementations, the token value may express a data pattern that defines or describes values, operations, or objects that the token represents. For example, the data pattern expressed by the token value may identify a data type, such as positive integer, such that positive integer values, or string values that may be represented as positive integer values, may be identified as matching the token. A token may be a defined data structure (token data structure) that includes a token value. A token data structure may include data other than the token value, such as token type data.

The defined grammars implemented by the low-latency data access and analysis system 3000 may define or describe the tokens. The defined grammars implemented by the low-latency data access and analysis system 3000 may define or describe token types or classes, such as ontological tokens, control-word tokens, pattern tokens, literal tokens, chronometric tokens, and a skip-token. Other token types may be used.

An ontological token may represent a data portion in the low-latency data access and analysis system, such as an object represented in the low-latency data access and analysis system 3000, or a portion thereof, a table stored in the distributed in-memory database or stored in an external database, a column of a table stored in the distributed in-memory database or stored in an external database, or a value (constituent data) stored in a row and column of a table stored in the distributed in-memory database or stored in an external database. In some grammars implemented by the low-latency data access and analysis system 3000 the ontological tokens may include measure tokens representing measure data portions (measure columns), attribute tokens representing attribute data portions (attribute columns), and value tokens representing the respective values stored in the corresponding measure columns or attribute columns. For example, a worksheet object (analytical object) represented in the low-latency data access and analysis system 3000 may include a column that includes values generated based on values stored in one or more tables in the distributed in-memory database, and an ontological token may represent the column of the worksheet object.

A control-word token may be a character, a symbol, a word, or a defined ordered sequence of characters or symbols, defined or described in one or more grammars of the low-latency data access and analysis system 3000 as having one or more defined grammatical functions, which may be contextual. For example, the control-word token "sum" may be defined or described in one or more grammars of the low-latency data access and analysis system 3000 as indicating an additive aggregation. In another example, the control-word token "top" may be defined or described in one or more grammars of the low-latency data access and analysis system 3000 as indicating a maximal value from an ordered set. In another example, the control-word token "table" may be defined or described in one or more grammars of the low-latency data access and analysis system 3000 as indicating a table stored in the low-latency data access and analysis system 3000 or stored externally and accessed by the low-latency data access and analysis system 3000. The control-word tokens may include operator tokens, such as the equality operator token ("="), delimiter tokens, which may be paired, such as opening and closing brackets ("[", "]"). The control-word tokens may include stop-word tokens, such as "the" or "an".

A pattern token may be a definition or a description of units of data in the low-latency data access and analysis system, which may be expressed as a data type, such as positive integer, defined or described in one or more grammars of the low-latency data access and analysis system 3000.

A literal, or constant, token may include a literal, or constant, value such as "100" or the Boolean value TRUE. The literal, or constant, tokens may include number-word tokens (numerals or named numbers), such as number-word tokens for the positive integers between zero and one million, inclusive, or for the numerator, denominator, or both of fractional values, or combinations thereof. For example, "one hundred twenty-eight and three-fifths".

A chronometric token may represent a chronometric unit, such as a chronometric unit from the system-defined chronometry or a chronometric unit from a domain-specific chronometry defined or described in the low-latency data access and analysis system 3000. The chronometric tokens are automatically generated based on the respective chronometric datasets. For example, chronometric tokens corresponding to the chronometric units for the system-defined chronometry, such as "date", "day", "days", "daily", "week", "weeks", "weekly", "month", "months", "monthly", "quarter", "quarters", "quarterly", "year", "years", "yearly", and the like, may be automatically generated based on the chronometric dataset for the system-defined chronometry.

The skip-token may represent discrete data portions, such as respective portions of a string that are unresolvable in accordance with the other tokens defined or described in a respective grammar of the low-latency data access and analysis system 3000.

The relational analysis unit 3700 may automatically generate respective tokens representing the attributes, the measures, the tables, the columns, the values, unique identifiers, tags, links, keys, or any other data portion, or combination of data portions, or a portion thereof.

For example, the relational analysis unit 3700 may tokenize, identify semantics, or both, based on input data, such as input data representing user input, to generate the resolved request. The resolved request may include an ordered sequence of tokens that represent the request for data corresponding to the input data, and may transmit, send, or otherwise make accessible, the resolved request to the semantic interface unit 3600. The semantic interface unit 3600 may process or respond to a received resolved request.

The semantic interface unit 3600 may process or transform the received resolved request, which may be, at least in part, incompatible with the distributed in-memory database 3300, to generate one or more corresponding data-queries that are compatible with the distributed in-memory database 3300, which may include generating a proto-query representing the resolved request, generating a pseudo-query representing the proto-query, and generating the data-query representing the pseudo-query.

The semantic interface unit 3600 may generate an analytical object, such as an answer object, representing the resolved request, which may include representing the data expressing usage intent, such as by representing the request for data indicated by the data expressing usage intent.

The semantic interface unit 3600 may generate a proto-query based on the resolved request. A proto-query, which may be database agnostic, may be structured or formatted in a form, language, or protocol that differs from the defined structured query language of the distributed in-memory database 3300. Generating the proto-query may include identifying visualization identification data, such as an indication of a type of visualization, associated with the request for data, and generating the proto-query based on the resolved request and the visualization identification data.

The semantic interface unit 3600 may transform the proto-query to generate a pseudo-query. The pseudo-query, which may be database agnostic, may be structured or formatted in a form, language, or protocol that differs from the defined structured query language of the distributed in-memory database 3300. Generating a pseudo-query may include applying a defined transformation, or an ordered sequence of transformations. Generating a pseudo-query may include incorporating row-level security filters in the pseudo-query.

The semantic interface unit 3600 may generate a data-query based on the pseudo-query, such as by serializing the pseudo-query. The data-query, or a portion thereof, may be structured or formatted using the defined structured query language of the distributed in-memory database 3300. In some implementations, a data-query may be structured or formatted using a defined structured query language of another database, which may differ from the defined structured query language of the distributed in-memory database 3300. Generating the data-query may include using one or more defined rules for expressing respective the structure and content of a pseudo-query in the respective defined structured query language.

The semantic interface unit 3600 may communicate, or issue, the data-query to the distributed in-memory database 3300. In some implementations, processing or responding to a resolved request may include generating and issuing multiple data-queries to the distributed in-memory database 3300.

The semantic interface unit 3600 may receive results data from the distributed in-memory database 3300 responsive to one or more resolved requests. The semantic interface unit 3600 may process, format, or transform the results data to obtain visualization data. For example, the semantic interface unit 3600 may identify a visualization for representing or presenting the results data, or a portion thereof, such as based on the results data or a portion thereof. For example, the semantic interface unit 3600 may identifying a bar chart visualization for results data including one measure and attribute.

Although not shown separately in FIG. 3, the semantic interface unit 3600 may include a data visualization unit. In some embodiments, the data visualization unit may be a distinct unit, separate from the semantic interface unit 3600. In some embodiments, the data visualization unit may be included in the system access interface unit 3900. The data visualization unit, the system access interface unit 3900, or a combination thereof, may generate a user interface, or one or more portions thereof. For example, data visualization unit, the system access interface unit 3900, or a combination thereof, may obtain the results data, such as the visualization data, and may generate user interface elements (visualizations) representing the results data.

The semantic interface unit 3600 may implement object-level security, row-level security, or a combination thereof. In some implementations, the security and governance unit 3200 may implement, or partially implement, the object-level security, row-level security, or a combination thereof, in combination with the semantic interface unit 3600. Object-level security may include security associated with an object, such as a table, a column, a worksheet, an answer, or a pinboard. The object-level security may include column-level security, which include user-based or group-based access control of columns of data in the low-latency data, the indexes, or both. Row-level security may include user-based or group-based access control of rows of data in the low-latency data, the indexes, or both. The semantic interface unit 3600 may implement one or more authentication procedures, access control procedures, or a combination thereof. The object-level security, row-level security, column-level security, a combination thereof, or a portion thereof, may be represented, expressed, defined, or described as access-control data. The semantic interface unit 3600, or one or more other components of the low-latency data access and analysis system 3000, may control, such as grant, restrict, or prevent, access to one or more features, functions, units of data, or combinations thereof, in accordance with the access-control data. For example, in response to a request for data that includes a user identifier, the semantic interface unit 3600, or one or more other components of the low-latency data access and analysis system 3000, may obtain access-control data for the user identifier and may obtain results data in accordance with the access-control data such that a unit of data, such as a row or a column, that is identified in the access-control data as accessible to the user identifier and is responsive to the request for data is included in the results data and such that a unit of data, such as a row or a column, that is identified in the access-control data as inaccessible to the user identifier, or for which the access-control data omits or excludes corresponding data indicating that the unit of data is accessible to the user identifier, is omitted or excluded from the results data.

The semantic interface unit 3600 may implement one or more user-data integration features. For example, the semantic interface unit 3600 may generate and output a user interface, or a portion thereof, for inputting, uploading, or importing user data, may receive user data, and may import the user data. For example, the user data may be enterprise data.

The semantic interface unit 3600 may implement object statistical data collection. Object statistical data may include, for respective objects, temporal access information, access frequency information, access recency information, access requester information, or the like. For example, the semantic interface unit 3600 may obtain object statistical data as described with respect to the data utility unit 3720, the object utility unit 3810, or both. The semantic interface unit 3600 may send, transmit, or otherwise make available, the object statistical data for data-objects to the data utility unit 3720. The semantic interface unit 3600 may send, transmit, or otherwise make available, the object statistical data for analytical objects to the object utility unit 3810.

The semantic interface unit 3600 may implement or expose one or more services or application programming interfaces. For example, the semantic interface unit 3600 may implement one or more services for access by the system access interface unit 3900. In some implementations, one or more services or application programming interfaces may be exposed to one or more external devices or systems.

The semantic interface unit 3600 may generate and transmit, send, or otherwise communicate, one or more external communications, such as e-mail messages, such as periodically, in response to one or more events, or both. For example, the semantic interface unit 3600 may generate and transmit, send, or otherwise communicate, one or more external communications including a portable representation, such as a portable document format representation of one or more pinboards in accordance with a defined schedule, period, or interval. In another example, the semantic interface unit 3600 may generate and transmit, send, or otherwise communicate, one or more external communications in response to input data indicating an express request for a communication. In another example, the semantic interface unit 3600 may generate and transmit, send, or otherwise communicate, one or more external communications in response to one or more defined events, such as the expiration of a recency of access period for a user.

Although shown as a single unit in FIG. 3, the relational analysis unit 3700 may be implemented in a distributed configuration, which may include a primary relational analysis unit instance and one or more secondary relational analysis unit instances.

The relational analysis unit 3700 may generate, maintain, operate, or a combination thereof, one or more indexes, such as one or more of an ontological index, a constituent data index, a control-word index, a numeral index, or a constant index, based on the low-latency data stored in the distributed in-memory database 3300, the low-latency data access and analysis system 3000, or both. An index may be a defined data structure, or combination of data structures, for storing tokens, terms, or string keys, representing a set of data from one or more defined data sources in a form optimized for searching. For example, an index may be a collection of index shards. In some implementations, an index may be segmented into index segments and the index segments may be sharded into index shards. In some implementations, an index may be partitioned into index partitions, the index partitions may be segmented into index segments and the index segments may be sharded into index shards.

Generating, or building, an index may be performed to create or populate a previously unavailable index, which may be referred to as indexing the corresponding data, and may include regenerating, rebuilding, or reindexing to update or modify a previously available index, such as in response to a change in the indexed data (constituent data).

The ontological index may be an index of data (ontological data) describing the ontological structure or schema of the low-latency data access and analysis system 3000, the low-latency data stored in the distributed in-memory database 3300, or a combination thereof. For example, the ontological index may include data representing the table and column structure of the distributed in-memory database 3300. The relational analysis unit 3700 may generate, maintain, or both, the ontological index by communicating with, such as requesting ontological data from, the distributed in-memory ontology unit 3500, the semantic interface unit 3600, or both. Each record in the ontological index may correspond to a respective ontological token, such as a token that identifies a column by name.

The control-word index may be an index of a defined set of control-word tokens. For example, the control-word index may include the control-word token "sum", which may be identified in one or more grammars of the low-latency data access and analysis system 3000 as indicating an additive aggregation. The constant index may be an index of constant, or literal, tokens such as "100" or "true". The numeral index may be an index of number word tokens (or named numbers), such as number word tokens for the positive integers between zero and one million, inclusive.

The constituent data index may be an index of the constituent data values stored in the low-latency data access and analysis system 3000, such as in the distributed in-memory database 3300. The relational analysis unit 3700 may generate, maintain, or both, the constituent data index by communicating with, such as requesting data from, the distributed in-memory database 3300. For example, the relational analysis unit 3700 may send, or otherwise communicate, a message or signal to the distributed in-memory database 3300 indicating a request to perform an indexing data-query, the relational analysis unit 3700 may receive response data from the distributed in-memory database 3300 in response to the requested indexing data-query, and the relational analysis unit 3700 may generate the constituent data index, or a portion thereof, based on the response data. For example, the constituent data index may index data-objects.

An index shard may be used for token searching, such as exact match searching, prefix match searching, substring match searching, or suffix match searching. Exact match searching may include identifying tokens in the index shard that matches a defined target value. Prefix match searching may include identifying tokens in the index shard that include a prefix, or begin with a value, such as a character or string, that matches a defined target value. Substring match searching may include identifying tokens in the index shard that include a value, such as a character or string, that matches a defined target value. Suffix match searching may include identifying tokens in the index shard that include a suffix, or end with a value, such as a character or string, that matches a defined target value. In some implementations, an index shard may include multiple distinct index data structures. For example, an index shard may include a first index data structure optimized for exact match searching, prefix match searching, and suffix match searching, and a second index data structure optimized for substring match searching. Traversing, or otherwise accessing, managing, or using, an index may include identifying one or more of the index shards of the index and traversing the respective index shards. In some implementations, one or more indexes, or index shards, may be distributed, such as replicated on multiple relational analysis unit instances. For example, the ontological index may be replicated on each relational analysis unit instance.

The relational analysis unit 3700 may receive a request for data from the low-latency data access and analysis system 3000. For example, the relational analysis unit 3700 may receive data expressing usage intent indicating the request for data in response to input, such as user input, obtained via a user interface, such as a user interface generated, or partially generated, by the system access interface unit 3900, which may be a user interface operated on an external device, such as one of the client devices 2320, 2340 shown in FIG. 2. In some implementations, the relational analysis unit 3700 may receive the data expressing usage intent from the system access interface unit 3900 or from the semantic interface unit 3600. For example, the relational analysis unit 3700 may receive or access the data expressing usage intent in a request for data message or signal.

The relational analysis unit 3700 may process, parse, identify semantics, tokenize, or a combination thereof, the request for data to generate a resolved request, which may include identifying a database and visualization agnostic ordered sequence of tokens based on the data expressing usage intent. The data expressing usage intent, or request for data, may include request data, such as resolved-request data, unresolved request data, or a combination of resolved-request data and unresolved request data. The relational analysis unit 3700 may identify the resolved-request data. The relational analysis unit 3700 may identify the unresolved request data and may tokenize the unresolved request data.

Resolved-request data may be request data identified in the data expressing usage intent as resolved-request data. Each resolved-request data portion may correspond with a respective token in the low-latency data access and analysis system 3000. The data expressing usage intent may include information identifying one or more portions of the request data as resolved-request data.

Unresolved request data may be request data identified in the data expressing usage intent as unresolved request data, or request data for which the data expressing usage intent omits information identifying the request data as resolved-request data. Unresolved request data may include text or string data, which may include a character, sequence of characters, symbol, combination of symbols, word, sequence of words, phrase, or the like, for which information, such as tokenization binding data, identifying the text or string data as resolved-request data is absent or omitted from the request data. The data expressing usage intent may include information identifying one or more portions of the request data as unresolved request data. The data expressing usage intent may omit information identifying whether one or more portions of the request data are resolved-request data. The relational analysis unit 3700 may identify one or more portions of the request data for which the data expressing usage intent omits information identifying whether the one or more portions of the request data are resolved-request data as unresolved request data.

For example, the data expressing usage intent may include a request string and one or more indications that one or more portions of the request string are resolved-request data. One or more portions of the request string that are not identified as resolved-request data in the data expressing usage intent may be identified as unresolved request data. For example, the data expressing usage intent may include the request string "example text"; the data expressing usage intent may include information indicating that the first portion of the request string, "example", is resolved-request data; and the data expressing usage intent may omit information indicating that the second portion of the request string, "text", is resolved-request data.

The information identifying one or more portions of the request data as resolved-request data may include tokenization binding data indicating a previously identified token corresponding to the respective portion of the request data. The tokenization binding data corresponding to a respective token may include, for example, one or more of a column identifier indicating a column corresponding to the respective token, a data type identifier corresponding to the respective token, a table identifier indicating a table corresponding to the respective token, an indication of an aggregation corresponding to the respective token, or an indication of a join path associated with the respective token. Other tokenization binding data may be used. In some implementations, the data expressing usage intent may omit the tokenization binding data and may include an identifier that identifies the tokenization binding data.

The relational analysis unit 3700 may implement or access one or more grammar-specific tokenizers, such as a tokenizer for a defined data-analytics, or data-access-and-analytics, grammar or a tokenizer for a natural-language grammar. For example, the relational analysis unit 3700 may implement one or more of a formula tokenizer, a row-level-security tokenizer, a data-analytics tokenizer, or a natural language tokenizer. Other tokenizers may be used. In some implementations, the relational analysis unit 3700 may implement one or more of the grammar-specific tokenizers, or a portion thereof, by accessing another component of the low-latency data access and analysis system 3000 that implements the respective grammar-specific tokenizer, or a portion thereof. For example, the natural language processing unit 3710 may implement the natural language tokenizer and the relational analysis unit 3700 may access the natural language processing unit 3710 to implement natural language tokenization. In another example, the semantic interface unit 3600, the distributed in-memory database, or both, may implement a tokenizer for a grammar for the defined structured query language compatible with or implemented by the distributed in-memory database. In some implementations, the low-latency data access and analysis system 3000, such as the semantic interface unit 3600, may implement a tokenizer for a grammar for a defined structured query language compatible with or implemented by an external database.

A tokenizer, such as the data-analytics tokenizer, may parse text or string data (request string), such as string data included in a data expressing usage intent, in a defined read order, such as from left to right, such as on a character-by-character or symbol-by-symbol basis. For example, a request string may include a single character, symbol, or letter, and tokenization may include identifying one or more tokens matching, or partially matching, the input character.

Tokenization may include parsing the request string to identify one or more words or phrases. For example, the request string may include a sequence of characters, symbols, or letters, and tokenization may include parsing the sequence of characters in a defined order, such as from left to right, to identify distinct words or terms and identifying one or more tokens matching the respective words. In some implementations, word or phrase parsing may be based on one or more of a set of defined delimiters, such as a whitespace character, a punctuation character, or a mathematical operator.

The relational analysis unit 3700 may traverse one or more of the indexes to identify one or more tokens corresponding to a character, word, or phrase identified in the request string. Tokenization may include identifying multiple candidate tokens matching a character, word, or phrase identified in the request string. Candidate tokens may be ranked or ordered, such as based on probabilistic utility.

Tokenization may include match-length maximization. Match-length maximization may include ranking or ordering candidate matching tokens in descending magnitude order. For example, the longest candidate token, having the largest cardinality of characters or symbols, matching the request string, or a portion thereof, may be the highest ranked candidate token. For example, the request string may include a sequence of words or a semantic phrase, and tokenization may include identifying one or more tokens matching the input semantic phrase. In another example, the request string may include a sequence of phrases, and tokenization may include identifying one or more tokens matching the input word sequence. In some implementations, tokenization may include identifying the highest ranked candidate token for a portion of the request string as a resolved token for the portion of the request string.

Tokenization may include intent resolution to resolve the data representing usage intent such that each portion of the data representing usage intent is identified as corresponding to defined data in the low-latency database analysis system or is identified as unresolvable. Intent resolution may include identifying one or more phrases using one or more defined phrase patterns, which may include using one or more phrase indexes. A phrase pattern may indicate an ordered sequence of one or more phrase parts. The phrase parts may be defined tokens or token types. The respective phrase parts in a phrase pattern may have corresponding positions in the sequence of the phrase pattern. For example, a phrase pattern representing an implicit aggregation, such as a 'sum', of measure data may include a phrase part indicating a measure type token.

The relational analysis unit 3700 may implement one or more finite state machines. For example, tokenization may include using one or more finite state machines. A finite state machine may model or represent a defined set of states and a defined set of transitions between the states. A state may represent a condition of the system represented by the finite state machine at a defined temporal point. A finite state machine may transition from a state (current state) to a subsequent state in response to input (e.g., input to the finite state machine). A transition may define one or more actions or operations that the relational analysis unit 3700 may implement. One or more of the finite state machines may be non-deterministic, such that the finite state machine may transition from a state to zero or more subsequent states.

The relational analysis unit 3700 may generate, instantiate, or operate a tokenization finite state machine, which may represent the respective tokenization grammar. Generating, instantiating, or operating a finite state machine may include operating a finite state machine traverser for traversing the finite state machine. Instantiating the tokenization finite state machine may include entering an empty state, indicating the absence of received input. The relational analysis unit 3700 may initiate or execute an operation, such as an entry operation, corresponding to the empty state in response to entering the empty state. Subsequently, the relational analysis unit 3700 may receive input data, and the tokenization finite state machine may transition from the empty state to a state corresponding to the received input data. In some embodiments, the relational analysis unit 3700 may initiate one or more data-queries in response to transitioning to or from a respective state of a finite state machine. In the tokenization finite state machine, a state may represent a possible next token in the request string. The tokenization finite state machine may transition between states based on one or more defined transition weights, which may indicate a probability of transiting from a state to a subsequent state.

The tokenization finite state machine may determine tokenization based on probabilistic path utility. Probabilistic path utility may rank or order multiple candidate traversal paths for traversing the tokenization finite state machine based on the request string. The candidate paths may be ranked or ordered based on one or more defined probabilistic path utility metrics, which may be evaluated in a defined sequence. For example, the tokenization finite state machine may determine probabilistic path utility by evaluating the weights of the respective candidate transition paths, the lengths of the respective candidate transition paths, or a combination thereof. In some implementations, the weights of the respective candidate transition paths may be evaluated with high priority relative to the lengths of the respective candidate transition paths.

In some implementations, one or more transition paths evaluated by the tokenization finite state machine may include a bound state such that the candidate tokens available for tokenization of a portion of the request string may be limited based on the tokenization of a previously tokenized portion of the request string.

Tokenization may include matching a portion of the request string to one or more token types, such as a constant token type, a column name token type, a value token type, a control-word token type, a date value token type, a string value token type, or any other token type defined by the low-latency data access and analysis system 3000. A constant token type may be a fixed, or invariant, token type, such as a numeric value. A column name token type may correspond with a name of a column in the data model. A value token type may correspond with an indexed data value. A control-word token type may correspond with a defined set of control-words. A date value token type may be similar to a control-word token type and may correspond with a defined set of control-words for describing temporal information. A string value token type may correspond with an unindexed value.

Token matching may include ordering or weighting candidate token matches based on one or more token matching metrics. Token matching metrics may include whether a candidate match is within a defined data scope, such as a defined set of tables, wherein a candidate match outside the defined data scope (out-of-scope) may be ordered or weighted lower than a candidate match within the defined data scope (in-scope). Token matching metrics may include whether, or the degree to which, a candidate match increases query complexity, such as by spanning multiple roots, wherein a candidate match that increases complexity may be ordered or weighted lower than a candidate match that does not increase complexity or increases complexity to a lesser extent. Token matching metrics may include whether the candidate match is an exact match or a partial match, wherein a candidate match that is a partial may be ordered or weighted lower than a candidate match that is an exact match. In some implementations, the cardinality of the set of partial matches may be limited to a defined value.

Token matching metrics may include a token score (TokenScore), wherein a candidate match with a relatively low token score may be ordered or weighted lower than a candidate match with a relatively high token score. The token score for a candidate match may be determined based on one or more token scoring metrics. The token scoring metrics may include a finite state machine transition weight metric (FSMScore), wherein a weight of transitioning from a current state of the tokenization finite state machine to a state indicating a candidate matching token is the finite state machine transition weight metric. The token scoring metrics may include a cardinality penalty metric (CardinalityScore), wherein a cardinality of values (e.g., unique values) corresponding to the candidate matching token is used as a penalty metric (inverse cardinality), which may reduce the token score. The token scoring metrics may include an index utility metric (IndexScore), wherein a defined utility value, such as one, associated with an object, such as a column wherein the matching token represents the column or a value from the column, is the index utility metric. In some implementations, the defined utility values may be configured, such as in response to user input, on a per object (e.g., per column) basis. The token scoring metrics may include a usage metric (UBRScore). The usage metric may be determined based on a usage based ranking index, one or more usage ranking metrics, or a combination thereof. Determining the usage metric (UBRScore) may include determining a usage boost value (UBRBoost). The token score may be determined based on a defined combination of token scoring metrics. For example, determining the token score may be expressed as the following:

TokenScore=FSMScore*(IndexScore+
UBRScore*UBRBoost)+Min (CardinalityScore,
1).

Token matching may include grouping candidate token matches by match type, ranking or ordering on a per-match type basis based on token score, and ranking or ordering the match types. For example, the match types may include a first match type for exact matches (having the highest match type priority order), a second match type for prefix matches on ontological data (having a match type priority order lower than the first match type), a third match type for substring matches on ontological data and prefix matches on data values (having a match type priority order lower than the second match type), a fourth match type for substring matches on data values (having a match type priority order lower than the third match type), and a fifth match type for matches omitted from the first through fourth match types (having a match type priority order lower than the fourth match type). Other match types and match type orders may be used.

Tokenization may include ambiguity resolution. Ambiguity resolution may include token ambiguity resolution, join-path ambiguity resolution, or both. In some implementations, ambiguity resolution may cease tokenization in response to the identification of an automatic ambiguity resolution error or failure.

Token ambiguity may correspond with identifying two or more exactly matching candidate matching tokens. Token ambiguity resolution may be based on one or more token ambiguity resolution metrics. The token ambiguity resolution metrics may include using available previously resolved token matching or binding data and token ambiguity may be resolved in favor of available previously resolved token matching or binding data, other relevant tokens resolved from the request string, or both. The token ambiguity resolution may include resolving token ambiguity in favor of integer constants. The token ambiguity resolution may include resolving token ambiguity in favor of control-words, such as for tokens at the end of a request for data, such as last, that are not being edited.

Join-path ambiguity may correspond with identifying matching tokens having two or more candidate join paths. Join-path ambiguity resolution may be based on one or more join-path ambiguity resolution metrics. The join-path ambiguity resolution metrics may include using available previously resolved join-path binding data and join-path ambiguity may be resolved in favor of available previously resolved join-paths. The join-path ambiguity resolution may include favoring join paths that include in-scope objects over join paths that include out-of-scope objects. The join-path ambiguity resolution metrics may include a complexity minimization metric, which may favor a join path that omits or avoids increasing complexity over join paths that increase complexity, such as a join path that may introduce a chasm trap.

The relational analysis unit 3700 may identify a resolved request based on the request string. The resolved request, which may be database and visualization agnostic, may be expressed or communicated as an ordered sequence of tokens representing the request for data indicated by the request string. The relational analysis unit 3700 may instantiate, or generate, one or more resolved-request objects. For example, the relational analysis unit 3700 may create or store a resolved-request object corresponding to the resolved request in the distributed in-memory ontology unit 3500. The relational analysis unit 3700 may transmit, send, or otherwise make available, the resolved request to the semantic interface unit 3600.

In some implementations, the relational analysis unit 3700 may transmit, send, or otherwise make available, one or more resolved requests, or portions thereof, to the semantic interface unit 3600 in response to finite state machine transitions. For example, the relational analysis unit 3700 may instantiate a data-analysis object in response to a first transition of a finite state machine. The relational analysis unit 3700 may include a first data-analysis object instruction in the data-analysis object in response to a second transition of the finite state machine. The relational analysis unit 3700 may send the data-analysis object including the first data-analysis object instruction to the semantic interface unit 3600 in response to the second transition of the finite state machine. The relational analysis unit 3700 may include a second data-analysis object instruction in the data-analysis object in response to a third transition of the finite state machine. The relational analysis unit 3700 may send the data-analysis object including the data-analysis object instruction, or a combination of the first data-analysis object instruction and the second data-analysis object instruction, to the semantic interface unit 3600 in response to the third transition of the finite state machine. The data-analysis object instructions may be represented using any annotation, instruction, text, message, list, pseudo-code, comment, or the like, or any combination thereof that may be converted, transcoded, or translated into structured data-analysis instructions for accessing, retrieving, analyzing, or a combination thereof, data from the low-latency data, which may include generating data based on the low-latency data.

The relational analysis unit 3700 may provide an interface to permit the creation of user-defined syntax. For example, a user may associate a string with one or more tokens. Accordingly, when the string is entered, the pre-associated tokens are returned in lieu of searching for tokens to match the input.

The relational analysis unit 3700 may include a localization unit (not expressly shown). The localization, globalization, regionalization, or internationalization, unit may obtain source data expressed in accordance with a source expressive-form and may output destination data representing the source data, or a portion thereof, and expressed using a destination expressive-form. The data expressive-forms, such as the source expressive-form and the destination expressive-form, may include regional or customary forms of expression, such as numeric expression, temporal expression, currency expression, alphabets, natural-language elements, measurements, or the like. For example, the source expressive-form may be expressed using a canonical-form, which may include using a natural-language, which may be based on English, and the destination expressive-form may be expressed using a locale-specific form, which may include using another natural-language, which may be a natural-language that differs from the canonical-language. In another example, the destination expressive-form and the source expressive-form may be locale-specific expressive-forms and outputting the destination expressive-form representation of the source expressive-form data may include obtaining a canonical-form representation of the source expressive-form data and obtaining the destination expressive-form representation based on the canonical-form representation. Although, for simplicity and clarity, the grammars described herein, such as the data-analytics grammar and the natural language search grammar, are described with relation to the canonical expressive-form, the implementation of the respective grammars, or portions thereof, described herein may implement locale-specific expressive-forms. For example, the data-analytics tokenizer may include multiple locale-specific data-analytics tokenizers.

The natural language processing unit 3710 may receive input data including a natural language string, such as a natural language string generated in accordance with user input. The natural language string may represent a data request expressed in an unrestricted natural language form, for which data identified or obtained prior to, or in conjunction with, receiving the natural language string by the natural language processing unit 3710 indicating the semantic structure, correlation to the low-latency data access and analysis system 3000, or both, for at least a portion of the natural language string is unavailable or incomplete. Although not shown separately in FIG. 3, in some implementations, the natural language string may be generated or determined based on processing an analog signal, or a digital representation thereof, such as an audio stream or recording or a video stream or recording, which may include using speech-to-text conversion.

The natural language processing unit 3710 may analyze, process, or evaluate the natural language string, or a portion thereof, to generate or determine the semantic structure, correlation to the low-latency data access and analysis system 3000, or both, for at least a portion of the natural language string. For example, the natural language processing unit 3710 may identify one or more words or terms in the natural language string and may correlate the identified words to tokens defined in the low-latency data access and analysis system 3000. In another example, the natural language processing unit 3710 may identify a semantic structure for the natural language string, or a portion thereof. In another example, the natural language processing unit 3710 may identify a probabilistic intent for the natural language string, or a portion thereof, which may correspond to an operative feature of the low-latency data access and analysis system 3000, such as retrieving data from the internal data, analyzing data the internal data, or modifying the internal data.

The natural language processing unit 3710 may send, transmit, or otherwise communicate request data indicating the tokens, relationships, semantic data, probabilistic intent, or a combination thereof or one or more portions thereof, identified based on a natural language string to the relational analysis unit 3700.

The data utility unit 3720 may receive, process, and maintain user-agnostic utility data, such as system configuration data, user-specific utility data, such as utilization data, or both user-agnostic and user-specific utility data. The utility data may indicate whether a data portion, such as a column, a record, an insight, or any other data portion, has high utility or low utility within the system, such as among the users of the system. For example, the utility data may indicate that a defined column is a high-utility column or a low-utility column. The data utility unit 3720 may store the utility data, such as using the low-latency data structure. For example, in response to a user using, or accessing, a data portion, data utility unit 3720 may store utility data indicating the usage, or access, event for the data portion, which may include incrementing a usage event counter associated with the data portion. In some embodiments, the data utility unit 3720 may receive the information indicating the usage, or access, event for the data portion from the insight unit 3730, and the usage, or access, event for the data portion may indicate that the usage is associated with an insight.

As used herein, the term "utility" refers to a computer accessible data value, or values, representative of the usefulness of an aspect of the low-latency data access and analysis system, such as a data portion, an object, or a component of the low-latency data access and analysis system with respect to improving the efficiency, accuracy, or both, of the low-latency data access and analysis system. Unless otherwise expressly indicated, or otherwise clear from context, utility is relative within a defined data-domain or scope. For example, the utility of an object with respect to a user may be high relative to the utility of other objects with respect to the user. Express utility indicates expressly specified, defined, or configured utility, such as user or system defined utility. Probabilistic utility indicates utility calculated or determined using utility data and expresses a statistical probability of usefulness for a respective aspect of the low-latency data access and analysis system. Unless otherwise expressly indicated, or otherwise clear from context, utility is access context specific. For example, the utility of an object with respect to the access context of a user may be high relative to the utility of the object with respect to the respective access contexts of other users.

The data utility unit 3720 may receive a signal, message, or other communication, indicating a request for utility information. The request for utility information may indicate an object or data portion. The data utility unit 3720 may determine, identify, or obtain utility data associated with the identified object or data portion. The data utility unit 3720 may generate and send utility response data responsive to the request that may indicate the utility data associated with the identified object or data portion.

The data utility unit 3720 may generate, maintain, operate, or a combination thereof, one or more indexes, such as one or more of a usage (or utility) index, a resolved-request index, or a phrase index, based on the low-latency data stored in the distributed in-memory database 3300, the low-latency data access and analysis system 3000, or both.

The insight unit 3730 may automatically identify one or more insights, which may be data other than data expressly requested by a user, and which may be identified and prioritized, or both, based on probabilistic utility.

The object search unit 3800 may generate, maintain, operate, or a combination thereof, one or more object-indexes, which may be based on the analytical objects represented in the low-latency data access and analysis system 3000, or a portion thereof, such as pinboards, answers, and worksheets. An object-index may be a defined data structure, or combination of data structures, for storing analytical-object data in a form optimized for searching. Although shown as a single unit in FIG. 3, the object search unit 3800 may interface with a distinct, separate, object indexing unit (not expressly shown).

The object search unit 3800 may include an object-index population interface, an object-index search interface, or both. The object-index population interface may obtain and store, load, or populate analytical-object data, or a portion thereof, in the object-indexes. The object-index search interface may efficiently access or retrieve analytical-object data from the object-indexes such as by searching or traversing the object-indexes, or one or more portions thereof. In some implementations, the object-index population interface, or a portion thereof, may be a distinct, independent unit.

The object-index population interface may populate, update, or both the object-indexes, such as periodically, such as in accordance with a defined temporal period, such as thirty minutes. Populating, or updating, the object-indexes may include obtaining object indexing data for indexing the analytical objects represented in the low-latency data access and analysis system 3000. For example, the object-index population interface may obtain the analytical-object indexing data, such as from the distributed in-memory ontology unit 3500. Populating, or updating, the object-indexes may include generating or creating an indexing data structure representing an object. The indexing data structure for representing an object may differ from the data structure used for representing the object in other components of the low-latency data access and analysis system 3000, such as in the distributed in-memory ontology unit 3500.

The object indexing data for an analytical object may be a subset of the object data for the analytical object. The object indexing data for an analytical object may include an object identifier for the analytical object uniquely identifying the analytical object in the low-latency data access and analysis system 3000, or in a defined data-domain within the low-latency data access and analysis system 3000. The low-latency data access and analysis system 3000 may uniquely, unambiguously, distinguish an object from other objects based on the object identifier associated with the object. The object indexing data for an analytical object may include data non-uniquely identifying the object. The low-latency data access and analysis system 3000 may identify one or more analytical objects based on the non-uniquely identifying data associated with the respective objects, or one or more portions thereof. In some implementations, an object identifier may be an ordered combination of non-uniquely identifying object data that, as expressed in the ordered combination, is uniquely identifying. The low-latency data access and analysis system 3000 may enforce the uniqueness of the object identifiers.

Populating, or updating, the object-indexes may include indexing the analytical object by including or storing the object indexing data in the object-indexes. For example, the object indexing data may include data for an analytical object, the object-indexes may omit data for the analytical object, and the object-index population interface may include or store the object indexing data in an object-index. In another example, the object indexing data may include data for an analytical object, the object-indexes may include data for the analytical object, and the object-index population interface may update the object indexing data for the analytical object in the object-indexes in accordance with the object indexing data.

Populating, or updating, the object-indexes may include obtaining object utility data for the analytical objects represented in the low-latency data access and analysis system 3000. For example, the object-index population interface may obtain the object utility data, such as from the object utility unit 3810. The object-index population interface may include the object utility data in the object-indexes in association with the corresponding objects.

In some implementations, the object-index population interface may receive, obtain, or otherwise access the object utility data from a distinct, independent, object utility data population unit, which may read, obtain, or otherwise access object utility data from the object utility unit 3810 and may send, transmit, or otherwise provide, the object utility data to the object search unit 3800. The object utility data population unit may send, transmit, or otherwise provide, the object utility data to the object search unit 3800 periodically, such as in accordance with a defined temporal period, such as thirty minutes.

The object-index search interface may receive, access, or otherwise obtain data expressing usage intent with respect to the low-latency data access and analysis system 3000, which may represent a request to access data in the low-latency data access and analysis system 3000, which may represent a request to access one or more analytical objects represented in the low-latency data access and analysis system 3000. The object-index search interface may generate one or more object-index queries based on the data expressing usage intent. The object-index search interface may send, transmit, or otherwise make available the object-index queries to one or more of the object-indexes.

The object-index search interface may receive, obtain, or otherwise access object search results data indicating one or more analytical objects identified by searching or traversing the object-indexes in accordance with the object-index queries. The object-index search interface may sort or rank the object search results data based on probabilistic utility in accordance with the object utility data for the analytical objects in the object search results data. In some implementations, the object-index search interface may include one or more object search ranking metrics with the object-index queries and may receive the object search results data sorted or ranked based on probabilistic utility in accordance with the object utility data for the objects in the object search results data and in accordance with the object search ranking metrics.

For example, the data expressing usage intent may include a user identifier, and the object search results data may include object search results data sorted or ranked based on probabilistic utility for the user. In another example, the data expressing usage intent may include a user identifier and one or more search terms, and the object search results data may include object search results data sorted or ranked based on probabilistic utility for the user identified by searching or traversing the object-indexes in accordance with the search terms.

The object-index search interface may generate and send, transmit, or otherwise make available the sorted or ranked object search results data to another component of the low-latency data access and analysis system 3000, such as for further processing and display to the user.

The object utility unit 3810 may receive, process, and maintain user-specific object utility data for objects represented in the low-latency data access and analysis system 3000. The user-specific object utility data may indicate whether an object has high utility or low utility for the user.

The object utility unit 3810 may store the user-specific object utility data, such as on a per-object basis, a per-activity basis, or both. For example, in response to data indicating an object access activity, such as a user using, viewing, or otherwise accessing, an object, the object utility unit 3810 may store user-specific object utility data indicating the object access activity for the object, which may include incrementing an object access activity counter associated with the object, which may be a user-specific object access activity counter. In another example, in response to data indicating an object storage activity, such as a user storing an object, the object utility unit 3810 may store user-specific object utility data indicating the object storage activity for the object, which may include incrementing a storage activity counter associated with the object, which may be a user-specific object storage activity counter. The user-specific object utility data may include temporal information, such as a temporal location identifier associated with the object activity. Other information associated with the object activity may be included in the object utility data.

The object utility unit 3810 may receive a signal, message, or other communication, indicating a request for object utility information. The request for object utility information may indicate one or more objects, one or more users, one or more activities, temporal information, or a combination thereof. The request for object utility information may indicate a request for object utility data, object utility counter data, or both.

The object utility unit 3810 may determine, identify, or obtain object utility data in accordance with the request for object utility information. The object utility unit 3810 may generate and send object utility response data responsive to the request that may indicate the object utility data, or a portion thereof, in accordance with the request for object utility information.

For example, a request for object utility information may indicate a user, an object, temporal information, such as information indicating a temporal span, and an object activity, such as the object access activity. The request for object utility information may indicate a request for object utility counter data. The object utility unit 3810 may determine, identify, or obtain object utility counter data associated with the user, the object, and the object activity having a temporal location within the temporal span, and the object utility unit 3810 may generate and send object utility response data including the identified object utility counter data.

In some implementations, a request for object utility information may indicate multiple users, or may omit indicating a user, and the object utility unit 3810 may identify user-agnostic object utility data aggregating the user-specific object utility data. In some implementations, a request for object utility information may indicate multiple objects, may omit indicating an object, or may indicate an object type, such as answer, pinboard, or worksheet, and the object utility unit 3810 may identify the object utility data by aggregating the object utility data for multiple objects in accordance with the request. Other object utility aggregations may be used.

The system configuration unit 3820 implement or apply one or more low-latency data access and analysis system configurations to enable, disable, or configure one or more operative features of the low-latency data access and analysis system 3000. The system configuration unit 3820 may store data representing or defining the one or more low-latency data access and analysis system configurations. The system configuration unit 3820 may receive signals or messages indicating input data, such as input data generated via a system access interface, such as a user interface, for accessing or modifying the low-latency data access and analysis system configurations. The system configuration unit 3820 may generate, modify, delete, or otherwise maintain the low-latency data access and analysis system configurations, such as in response to the input data. The system configuration unit 3820 may generate or determine output data, and may output the output data, for a system access interface, or a portion or portions thereof, for the low-latency data access and analysis system configurations, such as for presenting a user interface for the low-latency data access and analysis system configurations. Although not shown in FIG. 3, the system configuration unit 3820 may communicate with a repository, such as an external centralized repository, of low-latency data access and analysis system configurations; the system configuration unit 3820 may receive one or more low-latency data access and analysis system configurations from the repository, and may control or configure one or more operative features of the low-latency data access and analysis system 3000 in response to receiving one or more low-latency data access and analysis system configurations from the repository.

The user customization unit 3830 may receive, process, and maintain user-specific utility data, user defined configuration data, user defined preference data, or a combination thereof. The user-specific utility data may indicate whether a data portion, such as a column, a record, autonomous-analysis (autoanalysis) data, or any other data portion or object, has high utility or low utility to an identified user. For example, the user-specific utility data may indicate that a defined column is a high-utility column or a low-utility column. The user customization unit 3830 may store the user-specific utility data, such as using the low-latency data structure. The user-specific utility data may include, feedback data, such as feedback indicating user input expressly describing or representing the utility of a data portion or object in response to utilization of the data portion or object, such as positive feedback indicating high utility or negative feedback indicating low utility. The user customization unit 3830 may store the feedback in association with a user identifier. The user customization unit 3830 may store the feedback in association with the access context in which feedback was obtained. The user customization data, or a portion thereof, may be stored in an in-memory storage unit of the low-latency data access and analysis system. In some implementations, the user customization data, or a portion thereof, may be stored in the persistent storage unit 3930.

The system access interface unit 3900 may interface with, or communicate with, a system access unit (not shown in FIG. 3), which may be a client device, a user device, or another external device or system, or a combination thereof, to provide access to the internal data, features of the low-latency data access and analysis system 3000, or a combination thereof. For example, the system access interface unit 3900 may receive signals, message, or other communications representing interactions with the internal data, such as data expressing usage intent and may output response messages, signals, or other communications responsive to the received requests.

The system access interface unit 3900 may generate data for presenting a user interface, or one or more portions thereof, for the low-latency data access and analysis system 3000. For example, the system access interface unit 3900 may generate instructions for rendering, or otherwise presenting, the user interface, or one or more portions thereof and may transmit, or otherwise make available, the instructions for rendering, or otherwise presenting, the user interface, or one or more portions thereof to the system access unit, for presentation to a user of the system access unit. For example, the system access unit may present the user interface via a web browser or a web application and the instructions may be in the form of HTML, JavaScript, or the like.

In an example, the system access interface unit 3900 may include a data-analytics field user interface element in the user interface. The data-analytics field user interface element may be an unstructured string user input element or field. The system access unit may display the unstructured string user input element. The system access unit may receive input data, such as user input data, corresponding to the unstructured string user input element. The system access unit may transmit, or otherwise make available, the unstructured string user input to the system access interface unit 3900. The user interface may include other user interface elements and the system access unit may transmit, or otherwise make available, other user input data to the system access interface unit 3900.

The system access interface unit 3900 may obtain the user input data, such as the unstructured string, from the system access unit. The system access interface unit 3900 may transmit, or otherwise make available, the user input data to one or more of the other components of the low-latency data access and analysis system 3000.

In some embodiments, the system access interface unit 3900 may obtain the unstructured string user input as a sequence of individual characters or symbols, and the system access interface unit 3900 may sequentially transmit, or otherwise make available, individual or groups of characters or symbols of the user input data to one or more of the other components of the low-latency data access and analysis system 3000.

In some embodiments, system access interface unit 3900 may obtain the unstructured string user input as a sequence of individual characters or symbols, the system access interface unit 3900 may aggregate the sequence of individual characters or symbols, and may sequentially transmit, or otherwise make available, a current aggregation of the received user input data to one or more of the other components of the low-latency data access and analysis system 3000, in response to receiving respective characters or symbols from the sequence, such as on a per-character or per-symbol basis.

The real-time collaboration unit 3910 may receive signals or messages representing input received in accordance with multiple users, or multiple system access devices, associated with a collaboration context or session, may output data, such as visualizations, generated or determined by the low-latency data access and analysis system 3000 to multiple users associated with the collaboration context or session, or both. The real-time collaboration unit 3910 may receive signals or messages representing input received in accordance with one or more users indicating a request to establish a collaboration context or session, and may generate, maintain, or modify collaboration data representing the collaboration context or session, such as a collaboration session identifier. The real-time collaboration unit 3910 may receive signals or messages representing input received in accordance with one or more users indicating a request to participate in, or otherwise associate with, a currently active collaboration context or session, and may associate the one or more users with the currently active collaboration context or session. In some implementations, the input, output, or both, of the real-time collaboration unit 3910 may include synchronization data, such as temporal data, that may be used to maintain synchronization, with respect to the collaboration context or session, among the low-latency data access and analysis system 3000 and one or more system access devices associated with, or otherwise accessing, the collaboration context or session.

The third-party integration unit 3920 may include an electronic communication interface, such as an application programming interface (API), for interfacing or communicating between an external, such as third party, application or system, and the low-latency data access and analysis system 3000. For example, the third-party integration unit 3920 may include an electronic communication interface to transfer data between the low-latency data access and analysis system 3000 and one or more external applications or systems, such as by importing data into the low-latency data access and analysis system 3000 from the external applications or systems or exporting data from the low-latency data access and analysis system 3000 to the external applications or systems. For example, the third-party integration unit 3920 may include an electronic communication interface for electronic communication with an external exchange, transfer, load (ETL) system, which may import data into the low-latency data access and analysis system 3000 from an external data source or may export data from the low-latency data access and analysis system 3000 to an external data repository. In another example, the third-party integration unit 3920 may include an electronic communication interface for electronic communication with external machine learning analysis software, which may export data from the low-latency data access and analysis system 3000 to the external machine learning analysis software and may import data into the low-latency data access and analysis system 3000 from the external machine learning analysis software. The third-party integration unit 3920 may transfer data independent of, or in conjunction with, the system access interface unit 3900, the enterprise data interface unit 3400, or both.

The persistent storage unit 3930 may include an interface for storing data on, accessing data from, or both, one or more persistent data storage devices or systems. For example, the persistent storage unit 3930 may include one or more persistent data storage devices, such as the static memory 1200 shown in FIG. 1. Although shown as a single unit in FIG. 3, the persistent storage unit 3930 may include multiple components, such as in a distributed or clustered configuration. The persistent storage unit 3930 may include one or more internal interfaces, such as electronic communication or application programming interfaces, for receiving data from, sending data to, or both other components of the low-latency data access and analysis system 3000. The persistent storage unit 3930 may include one or more external interfaces, such as electronic communication or application programming interfaces, for receiving data from, sending data to, or both, one or more external systems or devices, such as an external persistent storage system. For example, the persistent storage unit 3930 may include an internal interface for obtaining key-value tuple data from other components of the low-latency data access and analysis system 3000, an external interface for sending the key-value tuple data to, or storing the key-value tuple data on, an external persistent storage system, an external interface for obtaining, or otherwise accessing, the key-value tuple data from the external persistent storage system, and an internal key-value tuple data for sending, or otherwise making available, the key-value tuple data to other components of the low-latency data access and analysis system 3000. In another example, the persistent storage unit 3930 may include a first external interface for storing data on, or obtaining data from, a first external persistent storage system, and a second external interface for storing data on, or obtaining data from, a second external persistent storage system.

Figure 4:
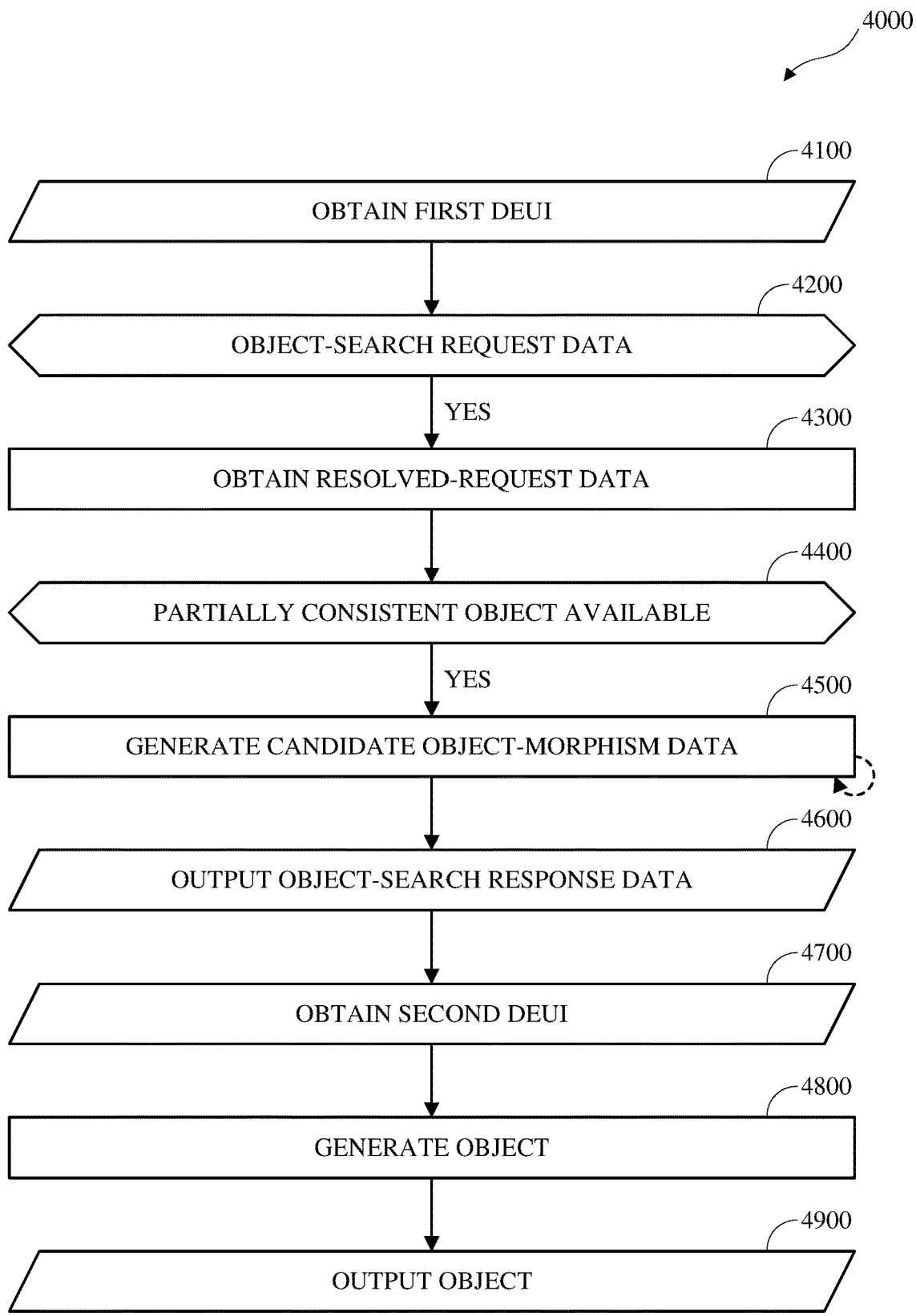
FIG. 4 is a flow diagram of an example of a method of generating object morphisms during object search.

FIG. 4 is a flow diagram of an example of a method of generating object morphisms during object search 4000. Generating object morphisms during object search 4000 may be implemented in a low-latency data access and analysis system, such as the low-latency data access and analysis system 3000 show in FIG. 3, such as by a system access interface unit, such as the system access interface unit 3900 shown in FIG. 3, an object search unit, such as the object search unit 3800 shown in FIG. 3, a semantic interface unit, such as the semantic interface unit 3600 shown in FIG. 3, an ontology unit, such as the distributed in-memory ontology unit 3500 shown in FIG. 3, an object search unit, such as the object search unit 3800 shown in FIG. 3, an object indexing unit, an object visualization capture storage unit, or a combination thereof.

As shown, generating object morphisms during object search 4000 includes obtaining first data expressing usage intent with respect to the low-latency data access and analysis system 4100, determining whether the first data expressing usage intent includes object-search request data 4200, obtaining object-search resolved-request data representing object-search terms 4300, determining whether partially consistent analytical objects are available 4400, generating candidate object-morphism data 4500, outputting object-search response data 4600, obtaining second data expressing usage intent with respect to the low-latency data access and analysis system 4700, generating an analytical object 4800, and outputting response data representing the analytical object 4900.

Object-morphism data is data, a corresponding data structure, or both, that defines or describes an object morphism in a form that is operable by the low-latency data access and analysis system to automatically generate an analytical object previously unavailable in the low-latency data access and analysis system by referencing another analytical object, previously available in the low-latency data access and analysis system, identified as partially consistent with object search terms in accordance with a request to search the low-latency data access and analysis system for previously available analytical objects that are consistent with the object search terms, wherein the object morphism expresses a structure-preserving mapping from the previously available partially consistent analytical object to the analytical object generated using the object-morphism data. For example, the object-morphism data for an object morphism may include, in a defined object-morphism data structure, a data source identifier, such as a logical column GUID, a mathematical operator, or an indication thereof, such as an operator token, and a data value, and includes, or is associated with, an identifier of a previously generated analytical object available in the low-latency data access and analysis system, wherein the low-latency data access and analysis system includes or otherwise accesses a database that stores the data value in the data source, and wherein the previously generated analytical object expresses a request to obtain data from the low-latency data access and analysis system in accordance with another data value stored in the data source.

As used herein, the term "consistent" indicates that the low-latency data access and analysis system, or a component thereof, determines that an automatically generated similarity metric, such as a semantic similarity metric, indicating a measurement of similarity between two objects, or other units of data, such as between an analytical object and resolved-request data for a current request for data, is greater than or equal to a respective defined similarity threshold, except as is expressly described herein or as is otherwise clear from context. As used herein, the term "inconsistent" indicates that the low-latency data access and analysis system, or a component thereof, determines that an automatically generated similarity metric, such as a semantic similarity metric, indicating a measurement of similarity between two objects, or other units of data, or between respective portions thereof, such as between a token of a resolved request of an analytical object and a token of resolved-request data generated in response to a current request for data, is less than a respective defined similarity threshold, except as is expressly described herein or as is otherwise clear from context. As used herein, the term "partially consistent" indicates that at least a portion of the respective data is consistent and at least a portion of the respective data is inconsistent, except as is expressly described herein or as is otherwise clear from context.

Generating object morphisms during object search 4000 includes obtaining first data expressing usage intent with respect to the low-latency data access and analysis system 4100. Obtaining the first data expressing usage intent with respect to the low-latency data access and analysis system 4100 includes obtaining object-search request data. The system access interface unit may receive, access, or otherwise obtain the first data expressing usage intent, which may represent a request to access data in the low-latency database analysis system, which may represent a request to search for one or more objects represented in the low-latency database analysis system (obtaining object-search request data). For example, the system access interface unit may obtain the first data expressing usage intent in response to user input. The object-search request data includes one or more object-search terms. The first data expressing usage intent may include a user identifier. The system access interface unit may send, transmit, or otherwise make available the first data expressing usage intent, or a portion thereof, to the semantic interface unit. The semantic interface unit may receive, obtain, or otherwise access, the first data expressing usage intent, or a portion thereof, from the system access interface unit.

For example, the object-search request data may include the string "measured rainfall in South Carolina".

Generating object morphisms during object search 4000 includes determining whether the first data expressing usage intent includes object-search request data 4200. In some implementations, the low-latency data access and analysis system may determine that the first data expressing usage intent omits, or excludes, object-search request data and generating object morphisms during object search 4000 is otherwise omitted with respect to the first data expressing usage intent (not expressly shown). In some implementations, determining whether the first data expressing usage intent includes object-search request data 4200 includes determining that the first data expressing usage intent includes the object-search request data. For example, the data expressing usage intent may include a bit, a flag, or another unit or combination of units of data indicating that the data expressing usage intent includes the object-search request data.

Generating object morphisms during object search 4000 includes obtaining resolved-request data representing the object-search terms 4300 (object-search resolved-request data). The low-latency data access and analysis system, or a component thereof, such as the object search unit, obtains, such as generates, the object-search resolved-request data representing the object-search terms as a sequence of tokens as described herein, such as in response to determining that the data expressing usage intent includes the object-search request data, such as in accordance with a defined grammar implemented by the low-latency data access and analysis system, such as a defined object-search grammar implemented by the low-latency data access and analysis system. For example, the object search unit may process, parse, identify semantics, tokenize, or a combination thereof, the object-search terms to generate the object-search resolved-request data, which may include identifying a database and visualization agnostic ordered sequence of tokens based on the data expressing usage intent.

For example, the object-search request data may include the string "measured rainfall in South Carolina" and the corresponding object-search resolved-request data may include, as a defined sequence of tokens, a "measured" token, a "rainfall" token, a "South" token, and a "Carolina" token, wherein the word "in" from the data expressing usage intent is identified as a stop word and omitted from the object-search resolved-request data.

Generating object morphisms during object search 4000 includes determining whether partially consistent analytical objects are available 4400. The low-latency data access and analysis system, or a component thereof, such as the object search unit, determines whether one or more partially consistent analytical objects are available in the low-latency data access and analysis system 4400.

Determining whether one or more partially consistent analytical objects are available in the low-latency data access and analysis system 4400 includes obtaining object-search response data responsive to the first data expressing usage intent, such as responsive to the object-search request data included in the first data expressing usage intent. The low-latency data access and analysis system, or a component thereof, such as the semantic interface unit, may generate an object-search request, such as an object-search request message or an object-search request signal, in response to receiving the data expressing the usage intent from the system access interface unit. For example, the object-search request may include the user identifier, the object-search terms, or both. The semantic interface unit may send, transmit, or otherwise make available the object-search request to the object search unit. In some implementations, the object-search request may indicate a type of object-search request, such as an object-search request responsive to user input data expressing one or more object-search terms.

The low-latency data access and analysis system, or a component thereof, such as the object search unit, may receive, obtain, or otherwise access, the object-search request from the semantic interface unit. The object search unit may generate an object-index search request in response to receiving the object-search request from the semantic interface unit. The object search unit may send, transmit, or otherwise make available the object-index search request to the object indexing unit.

The low-latency data access and analysis system, or a component thereof, such as the object indexing unit, may receive, obtain, or otherwise access, the object-index search request from the object search unit. The object indexing unit may efficiently access or retrieve indexed object data, such as indexed object data corresponding to respective analytical objects, from one or more object-indexes, such as by searching or traversing the object-indexes, or one or more portions thereof, in accordance with the object-index search request. The object indexing unit may generate object-index response data including the indexed object data, or a portion thereof, sorting or ranking data, or a portion thereof, or a combination of the indexed object data and the sorting or ranking data, or a portion thereof. The object search may be limited by one or more data access or security rules or procedures, such as object-level security, column-level security, row-level security, or a combination thereof, in accordance with the user identifier, such that the object-index response data omits or excludes objects that are unavailable based on the user identifier, that include data obtained or derived from a data source, such as a table or a column, that are unavailable based on the user identifier, or that include data, such as value, a row, or a record, that is unavailable based on the user identifier. The object indexing unit may send, transmit, or otherwise make available the object-index response data to the object search unit.

The low-latency data access and analysis system, or a component thereof, such as the object search unit, may receive, obtain, or otherwise access, the object-index response data from the object indexing unit. The object search unit may generate object-search response data including the indexed object data, or a portion thereof, the sorting or ranking data, or a portion thereof, or a combination of the indexed object data and the sorting or ranking data, or a portion thereof. The object search unit may send, transmit, or otherwise make available the object-search response data to the semantic interface unit. The semantic interface unit may receive, obtain, or otherwise access the object-search response data from the object search unit.

In some implementations, the low-latency data access and analysis system, or a component thereof, such as the semantic interface unit, may determine that an analytical object (first analytical object) consistent with the object-search resolved-request data is available in the low-latency data access and analysis system, as indicated in the object-search response data, and generating object morphisms during object search 4000 is otherwise omitted with respect to the first data expressing usage intent (not expressly shown).

In the example shown in FIG. 4, the low-latency data access and analysis system, or a component thereof, such as the semantic interface unit, determines that an analytical object (first analytical object) consistent with the object-search resolved-request data is unavailable in the low-latency data access and analysis system, as indicated in the object-search response data, and determines that one or more analytical objects (a plurality of analytical objects), including a second analytical object, partially consistent with the object-search resolved-request data, such as consistent with a first portion of the object-search resolved-request data and inconsistent with a second portion of the object-search resolved-request data, are available in the low-latency data access and analysis system.

For example, the object-search request data may include the string "measured rainfall in South Carolina", the corresponding object-search resolved-request data may include, as a defined sequence of tokens, the tokens "measured", "rainfall", "South", and "Carolina", and the low-latency data access and analysis system, or a component thereof, such as the semantic interface unit, may obtain object-search response data indicating analytical-object data for a previously stored analytical object that includes resolved-request data that includes as a defined sequence of tokens, the tokens "precipitation", "North", and "Carolina".

Figure 5:
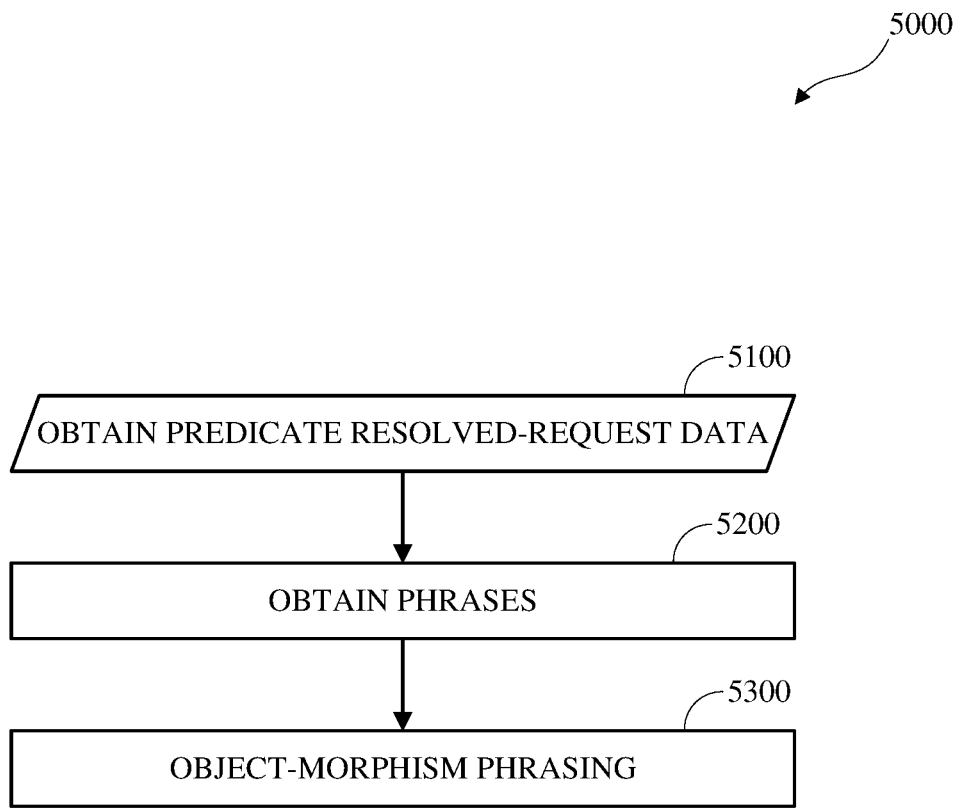
FIG. 5 is a flow diagram of an example of a method of generating candidate object-morphism data.

Candidate object-morphism data is generated 4500. For example, the low-latency data access and analysis system, or a component thereof, such as the semantic interface unit, generates candidate object-morphism data 4500 for one or more candidate object morphisms. Generating the candidate object-morphism data 4500 includes generating respective candidate object-morphism data with respect to the partially consistent analytical objects indicated in the object-search response data on a per-analytical-object basis in accordance with a corresponding inconsistent portion of the object-search resolved-request data, which is a portion, such as a token or a sequence of tokens, from the object-search resolved-request data, that is inconsistent with the corresponding partially consistent analytical object. For example, for the second analytical object (partially consistent analytical object), generating the candidate object-morphism data 4500 includes generating the candidate object-morphism data with respect to the second analytical object in accordance with the second portion of the object-search resolved-request data. An example of generating candidate object-morphism data 4500 is shown in FIG. 5. Object-morphism data is data that defines or describes an object morphism, associated with a previously generated analytical object, that is partially consistent with object-search request data, and is partially consistent with the partially consistent analytical object, such that an analytical object that differs from the partially consistent analytical object may be generated from the object-morphism data and the partially consistent analytical object.

A broken directional line is shown from and to generating candidate object-morphism data 4500 to indicate that respective candidate object-morphism data is generated for respective partially consistent analytical objects indicated in the object-search response data on a per-analytical-object basis. For example, the object-search response data may include data for a first partially consistent analytical object, a second partially consistent analytical object, and a third partially consistent analytical object, and first candidate object-morphism data may be generated for the first partially consistent analytical object, second candidate object-morphism data may be generated for the second partially consistent analytical object, and third candidate object-morphism data may be generated for the third partially consistent analytical object.

Generating object morphisms during object search 4000 includes outputting the object-search response data 4600, or a portion thereof. Outputting the object-search response data 4600 includes outputting the candidate object-morphism data for presentation to a user, such as by including the candidate object-morphism data in the object-search response data and outputting the object-search response data, or a portion thereof, for presentation to the user, such as via a user interface implemented by the system access interface unit.

Although not shown separately in FIG. 4, generating object morphisms during object search 4000 may include obtaining object detail data for the partially consistent analytical objects. For example, the semantic interface unit may generate one or more requests for object detail data. The requests for object detail data may include requests for object detail data on a per-object basis. The object detail data may be object-specific data stored in the ontology unit and omitted from the object-indexes. The semantic interface unit may send, transmit, or otherwise make available the requests for object detail data to the ontology unit. The ontology unit may receive, obtain, or otherwise access, the requests for object detail data from the semantic interface unit. The ontology unit may obtain the object detail data from the ontological data, such as in response to receiving the requests for object detail data from the semantic interface unit, for the objects indicated in the requests for object detail data. The ontology unit may generate object detail response data including the object detail data for the objects indicated in the requests for object detail data. The ontology unit may send, transmit, or otherwise make available the object detail response data to the semantic interface unit. The semantic interface unit may receive, obtain, or otherwise access, the object detail response data from the ontology unit. The semantic interface unit may include the object detail data, or a portion thereof, from the object detail response data in the object-search response data for corresponding objects. In some implementations, generating the object-search response data may include obtaining object visualization data for the respective analytical objects and including the object visualization data in the object-search response data.

The low-latency data access and analysis system, or a component thereof, such as the semantic interface unit, includes the candidate object-morphism data with the corresponding partially consistent analytical object data in the object-search response data.

The semantic interface unit may generate an object search response including the object-search response data, or a portion thereof. The semantic interface unit may send, transmit, or otherwise make available the object search response to the system access interface unit. The system access interface unit may receive, obtain, or otherwise access the object search response from the semantic interface unit. Outputting the object search response data may include outputting the object search response data, or one or more portions thereof, for one or more objects and outputting the corresponding candidate object-morphism data for the respective objects.

A respective candidate object morphism, or the candidate object-morphism data thereof, indicates a search and analysis phrase for combination with data, such as resolved-request data, extracted, or copied, from the partially consistent analytical object used to generate the respective candidate object morphism. The search and analysis phrase may include a data source, such as a column, which may be a column from a table indicated in the analytical-object data for the partially consistent analytical object used to generate the respective candidate object morphism. The search and analysis phrase may include a data value as a filtering metric with respect to the data source. In some implementations, the search and analysis phrase may include a chronometric filtering metric, such as an indication of a chronometric location or a chronometric unit. In some implementations, the search and analysis phrase may include visualization data, such as a visualization type.

For example, the object-search request data may include the string "measured rainfall in South Carolina", the corresponding object-search resolved-request data may include, as a defined sequence of tokens, the tokens "measured", "rainfall", "South", and "Carolina", the low-latency data access and analysis system, or a component thereof, such as the semantic interface unit, may obtain object-search response data indicating analytical-object data for a previously stored analytical object that includes resolved-request data that includes as a defined sequence of tokens, the tokens "precipitation", "North", and "Carolina", wherein the sequence of tokens "North" and "Carolina" are bound to a "region" data source (column), corresponding to a search and analysis phrase "region=North Carolina", and the low-latency data access and analysis system, or a component thereof, such as the semantic interface unit, may generate and output object search response data indicating the previously stored analytical object, which may include a visualization thereof, and indicating candidate object-morphism data for a candidate object morphism including a search and analysis phrase, such as "region=South Carolina", corresponding to, and differing from, the search and analysis phrase of the previously stored analytical object ("region=North Carolina").

Generating object morphisms during object search 4000 includes obtaining second data expressing usage intent with respect to the low-latency data access and analysis system 4700. Obtaining the second data expressing usage intent with respect to the low-latency data access and analysis system 4700 includes obtaining the second data expressing usage intent with respect to the low-latency data access and analysis system wherein the second data expressing usage intent indicates a selected object morphism (selected object-morphism data) from the candidate object morphisms indicated in the candidate object-morphism data, such as in response to input, such as user input, selecting the selected object morphism. Indicating the selected object morphism includes indicating the corresponding analytical object (second analytical object).

Generating object morphisms during object search 4000 includes generating an analytical object 4800 (generate object). Generating the analytical object 4800 (third analytical object) includes generating the analytical object in accordance with the selected object morphism and the partially consistent analytical object (second analytical object) used to generate the selected object morphism. Generating the analytical object 4800 omits updating, modifying, altering, or deleting the partially consistent analytical object or other previously stored analytical objects, except that usage or access data associated with the partially consistent analytical object corresponding to the selected object morphism may be updated or incremented.

Although not expressly shown in FIG. 4, generating the third analytical object 4800 includes generating resolved-request data for the third analytical object in accordance with the selected object morphism, the partially consistent analytical object (second analytical object) used to generate the selected object morphism, or a combination thereof.

In some implementations, the search and analysis phrase of the selected object morphism may be combined with the data, such as the resolved-request data, extracted, or copied, from the partially consistent analytical object corresponding to the selected object morphism by concatenation wherein the search and analysis phrase of the selected object morphism is concatenated subsequent to the resolved-request data extracted, or copied, from the partially consistent analytical object corresponding to the selected object morphism to form a resolved request for the generated analytical object (third analytical object).

In some implementations, combining the search and analysis phrase of the selected object morphism with the data, such as the resolved-request data, extracted, or copied, from the partially consistent analytical object corresponding to the selected object morphism may include omitting, or excluding, a portion, such as a corresponding partially consistent search and analysis phrase, of the resolved-request data extracted, or copied, from the partially consistent analytical object used to generate the selected object morphism from the resolved request for the generated analytical object (third analytical object).

For example, the object-search request data may include the string "measured rainfall in South Carolina", the corresponding object-search resolved-request data may include, as a defined sequence of tokens, the tokens "measured", "rainfall", "South", and "Carolina", the low-latency data access and analysis system, or a component thereof, such as the semantic interface unit, may obtain object-search response data indicating analytical-object data for a previously stored analytical object that includes resolved-request data that includes as a defined sequence of tokens, the tokens "precipitation", "North", and "Carolina", wherein the sequence of tokens "North" and "Carolina" are bound to a "region" data source (column), corresponding to a search and analysis phrase "region=North Carolina", the low-latency data access and analysis system, or a component thereof, such as the semantic interface unit, may generate and output object search response data indicating the previously stored analytical object, which may include a visualization thereof, and indicating candidate object-morphism data for a candidate object morphism including the search and analysis phrase "region=South Carolina", corresponding to, and differing from, the partially consistent search and analysis phrase of the previously stored partially consistent analytical object ("region=North Carolina"), the candidate object morphism may be identified as a selected object morphism, and the low-latency data access and analysis system, or a component thereof, such as the semantic interface unit, may generate an analytical object, which includes generating resolved-request data for the analytical object combining the sequence of tokens "precipitation", wherein the sequence includes one token, and corresponding token binding data, extracted from the previously stored analytical object with the sequence of tokens "South" and "Carolina", and corresponding token binding data binding the sequence of tokens "South" and "Carolina" to the "region" data source (e.g., "region=South Carolina"), and omitting, or excluding, the sequence of tokens "North" and "Carolina" from the generated analytical object.

Generating object morphisms during object search 4000 includes outputting response data representing the generated analytical object 4900 (output object) for presentation to the user. Outputting the response data representing the generated analytical object 4900 includes outputting the response data, such as responsive to the second data expressing usage intent. Outputting response data representing the generated analytical object 4900 includes including, in the response data, object-visualization data representing the generated analytical object. Although not shown separately in FIG. 4, outputting the response data representing the generated analytical object includes automatically generating a data query in accordance with the generated analytical object, such as in accordance with the resolved-request data for the third analytical object, and obtaining the response data, or a portion thereof, in response to execution of the generated data query by a corresponding database.

In some implementations, the resolved-request data obtained for the first data expressing usage intent includes an ordered sequence of tokens corresponding to a sentence embedding ($[q_1, q_2, \ldots, q_n]$), and the analytical objects in the low-latency data access and analysis system may be searched, such as to obtain pinboard objects, answer objects, visualization objects, or a combination thereof. A pinboard object (P) may include a set ($\mathcal{A}$) of zero or more answer objects ($\mathcal{A} = A_1, A_2, \ldots, A_m$), an answer object ($A_i$), or the sequence of tokens thereof, may be expressed, in embedding vector space, as a sequence of values, such as floating-point values, ($x_i$) ($A_i = x_1, x_2, \ldots x_n$).

Although not shown in FIG. 4, in some implementations, the first data expressing usage intent obtained 4100 may include data indicating a previously selected analytical object and a request for candidate object morphisms, and may omit, or exclude, object-search request data, determining whether the first data expressing usage intent includes object-search request data 4200 may include determining that the first data expressing usage intent omits, or excludes, the object-search request data, obtaining resolved-request data 4300, determining whether a partially consistent object is available 4400, and generating an object 4800 may be omitted, candidate object-morphism data may be generated 4500 based on the previously selected analytical object, which may include identifying analytical objects previously stored in the low-latency data access and analysis system, other than the previously selected analytical object, identifying respective semantic-similarity scores respectively indicating semantic-similarity between the previously selected analytical object and the respective previously stored analytical object, such as by determining a similarity, such as a cosine similarity, for a sentence embedding vector (as described herein) generated, or previously generated, for the previously selected analytical object and a sentence embedding vector generated, or previously generated, for the respective previously stored analytical object, outputting the object-search response data 4600 may include outputting data indicating one or more of the previously stored analytical objects, such as in descending order of semantic-similarity, as the candidate object-morphisms, obtaining second data expressing usage intent 4700 may include obtaining data indicating a selection of one of the previously stored analytical objects, and outputting the object 4900 may include outputting the selected previously stored analytical objects.

FIG. 5 is a flow diagram of an example of a method of generating candidate object-morphism data 5000. Generating candidate object-morphism data 5000 may be implemented in a low-latency data access and analysis system, such as the low-latency data access and analysis system 3000 show in FIG. 3, such as by a system access interface unit, such as the system access interface unit 3900 shown in FIG. 3, an object search unit, such as the object search unit 3800 shown in FIG. 3, a semantic interface unit, such as the semantic interface unit 3600 shown in FIG. 3, an ontology unit, such as the distributed in-memory ontology unit 3500 shown in FIG. 3, an object search unit, such as the object search unit 3800 shown in FIG. 3, an object indexing unit, an object visualization capture storage unit, or a combination thereof. Generating candidate object-morphism data 5000 may be me similar to an iteration of the generating candidate object-morphism data 4500 shown in FIG. 4.

As shown, generating candidate object-morphism data 5000 includes obtaining predicate resolved-request data 5100, obtaining a sequence of one or more phrases from the predicate resolved-request data 5200, and object-morphism phrasing 5300.

Although not expressly shown in FIG. 5, generating candidate object-morphism data 5000 includes obtaining object-search resolved-request data, such as the object-search resolved-request data obtained as described with respect to obtaining object-search resolved-request data representing the object-search terms 4300 as shown in FIG. 4.

Although not expressly shown in FIG. 5, generating candidate object-morphism data 5000 includes obtaining analytical-object data for a partially consistent analytical object (partially consistent analytical-object data), wherein the partially consistent analytical object is an analytical object generated, prior to and independent of generating candidate object-morphism data 5000, such as the partially consistent analytical object identified as described with respect to determining whether partially consistent analytical objects are available 4400 as shown in FIG. 4, such as the second analytical object.

The predicate resolved-request data (partially consistent resolved-request data) is obtained 5100 from the analytical-object data for the partially consistent analytical object (predicate analytical object) identified in accordance with the object-search resolved-request data. Obtaining the predicate resolved-request data includes extracting, reading, or copying, the predicate resolved-request data from the partially consistent analytical-object data. For example, the low-latency data access and analysis system, or a component thereof, such as the object search unit, may read and copy the predicate resolved-request data from the partially consistent analytical-object data.

For example, object-search request data may include the string "measured rainfall in South Carolina", the corresponding object-search resolved-request data may include, as a defined sequence of tokens, the tokens "measured", "rainfall", "South", and "Carolina", wherein the word "in" from the object-search request data is identified as a stop word and omitted from the object-search resolved-request data, and the low-latency data access and analysis system, or a component thereof, such as the semantic interface unit, may obtain object-search response data indicating analytical-object data for a previously stored analytical object that includes resolved-request data that is identified as predicate resolved-request data, that includes, as a defined sequence of tokens, the tokens "precipitation", "South", and "Carolina".

Although not shown in FIG. 5, in some implementations, obtaining predicate resolved-request data 5100 may be omitted and generating candidate object-morphism data 5000 may include obtaining descriptive data, such as a title or name, for the partially consistent analytical object, and using the descriptive data as the predicate resolved-request data.

A sequence, or ordered set, of one or more predicate search and analysis phrases ($[P_1, P_2, \ldots P_j]$) is obtained from the predicate resolved-request data 5200 (obtain phrases). The predicate resolved-request data may include data identifying the phrases as such. A respective predicate search and analysis phrase ($P_j$) from the sequence of one or more predicate search and analysis phrases ($[P_1, P_2, \ldots P_j]$) includes a respective sequence of one or more tokens. The low-latency data access and analysis system, or a component thereof, such as the object search unit, may obtain the sequence of one or more phrases ($[P_1, P_2, \ldots P_j]$) from the predicate resolved-request data. One or more of the predicate search and analysis phrases ($[P_1, P_2, \ldots P_j]$) may be associated with a respective data source. For predicate search and analysis phrases that are associated with a respective data source, the predicate resolved-request data includes data identifying the data source for the respective predicate search and analysis phrase ($P_j$). The low-latency data access and analysis system, or a component thereof, such as the object search unit, may obtain data identifying the data source for a respective predicate search and analysis phrase (pi) from the predicate resolved-request data.

For example, object-search request data may include the string "measured rainfall in South Carolina", the corresponding resolved-request data may include, as a defined sequence of tokens, the tokens "measured", "rainfall", "South", and "Carolina", the low-latency data access and analysis system, or a component thereof, such as the semantic interface unit, may obtain object-search response data indicating analytical-object data for a previously stored analytical object that includes resolved-request data that includes, as a defined sequence of tokens, the tokens "precipitation", "North", and "Carolina", wherein the sequence of tokens "precipitation", wherein the sequence has one token, is bound to a "precipitation" data source (table) and the sequence of tokens "North" and "Carolina" is bound to a "region" data source (column), the low-latency data access and analysis system, or a component thereof, such as the semantic interface unit, may identify the previously stored analytical object as a partially consistent analytical object, and the low-latency data access and analysis system, or a component thereof, such as the semantic interface unit, may identify the resolved-request data for the partially consistent analytical object, which includes, as the defined sequence of tokens, the tokens "precipitation", "North", and "Carolina", wherein the sequence of tokens "precipitation", wherein the sequence has one token, bound to the "precipitation" data source (table) is identified as a first phrase ($P_1$) "precipitation" and the sequence of tokens "North" and "Carolina" bound to the "region" data source (column) is identified as a second phrase (P$_2$) "North Carolina", bound to the "region" data source (column), which may be expressed as "region=North Carolina".

Figure 6:
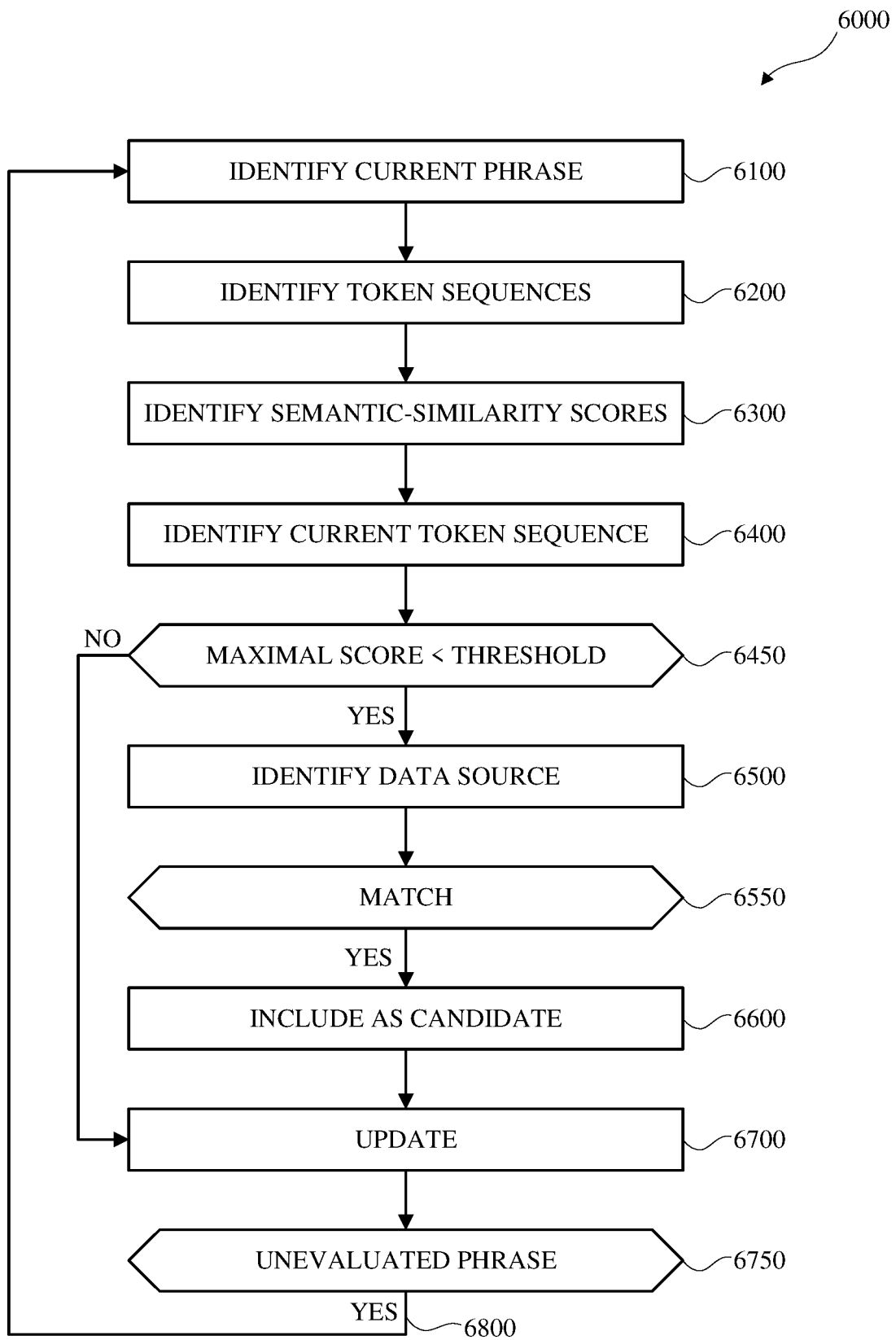
FIG. 6 is a flow diagram of an example of a method of object-morphism phrasing.

One or more candidate object morphisms are obtained by object-morphism phrasing 5300 using the sequence of one or more phrases ([P$_1$, P$_2$, . . . P$_j$]) as current phrases and using the object-search resolved-request data as a current sequence of tokens. An example of object-morphism phrasing is shown in FIG. 6. For example, the low-latency data access and analysis system, or a component thereof, such as the object search unit, may obtain one or more candidate object morphisms by object-morphism phrasing using the sequence of one or more phrases as current phrases and using the object-search resolved-request data as a current sequence of tokens.

FIG. 6 is a flow diagram of an example of a method of object-morphism phrasing 6000. Object-morphism phrasing 6000 may be implemented in a low-latency data access and analysis system, such as the low-latency data access and analysis system 3000 show in FIG. 3, such as by a system access interface unit, such as the system access interface unit 3900 shown in FIG. 3, an object search unit, such as the object search unit 3800 shown in FIG. 3, a semantic interface unit, such as the semantic interface unit 3600 shown in FIG. 3, an ontology unit, such as the distributed in-memory ontology unit 3500 shown in FIG. 3, an object search unit, such as the object search unit 3800 shown in FIG. 3, an object indexing unit, an object visualization capture storage unit, or a combination thereof. Object-morphism phrasing 6000 may be me similar to the object-morphism phrasing 5300 shown in FIG. 5.

Although not shown separately in FIG. 6, object-morphism phrasing 6000 includes using one or more current phrases ([P$_1$, P$_2$, . . . P$_j$]) and using a current sequence of tokens including one or more tokens. For example, as described with respect to the object-morphism phrasing 5300 shown in FIG. 5, a sequence of one or more phrases obtained from the predicate resolved-request data may be used as the current phrases ([P$_1$, P$_2$, . . . P$_j$]) and a sequence of tokens from the object-search resolved-request data, such as the object-search resolved-request data obtained as shown at 4300 in FIG. 4, may be used as the current sequence of tokens (Q).

For example, the resolved-request data for the current request may include, as a defined sequence of tokens, the tokens "measured", "rainfall", "South", and "Carolina", the low-latency data access and analysis system, or a component thereof, such as the semantic interface unit, may obtain object-search response data indicating analytical-object data for a previously stored analytical object that includes resolved-request data that includes, as a defined sequence of tokens, the tokens "precipitation", "North", and "Carolina", wherein the sequence of tokens "precipitation", wherein the sequence has one token, is bound to a "precipitation" data source (table) and the sequence of tokens "North" and "Carolina" is bound to a "region" data source (column), the low-latency data access and analysis system, or a component thereof, such as the semantic interface unit, may identify the previously stored analytical object as a partially consistent analytical object, and the low-latency data access and analysis system, or a component thereof, such as the semantic interface unit, may identify the resolved-request data for the partially consistent analytical object, which includes, as the defined sequence of tokens, the tokens "precipitation", "North", and "Carolina", wherein the sequence of tokens "precipitation", wherein the sequence has one token, bound to the "precipitation" data source (table) is identified as a first phrase (P$_1$) "precipitation" and the sequence of tokens "North" and "Carolina" bound to the "region" data source (column) is identified as a second phrase (P$_2$) "North Carolina", bound to the "region" data source (column), which may be expressed as "region=North Carolina".

As shown in FIG. 6, object-morphism phrasing 6000 includes identifying a current phrase 6100, identifying token sequences 6200, identifying semantic-similarity scores 6300, identifying a current token sequence 6400, determining whether a maximal semantic-similarity score from the semantic-similarity scores is less than a defined semantic similarity threshold 6450, identifying a data source 6500, determining whether data available from the data source includes a value matching the current token sequence 6550, including, in the candidate object morphisms, a candidate object morphism that includes the current token sequence 6600, obtaining updated current phrases and an updated current sequence of tokens 6700, determining whether the updated current phrases include at least one phrase 6750, and current phrase filtering 6800.

Object-morphism phrasing 6000 includes identifying a current phrase 6100 (P$_j$), such as from the current phrases ([P$_1$, P$_2$, . . . P$_j$]), such as in sequential order. The current phrase (P$_n$) includes one or more tokens. A length (N$_n$) of the current phrase (P$_n$), which is the cardinality of tokens (N$_n$) of the current phrase (P$_n$), is identified (current cardinality of tokens) (N$_n$=P$_n$·length). The identified current phrase (P$_n$) may be the sequentially earliest unevaluated, with respect to the current performance of object-morphism phrasing 6000, phrase from the current phrases ([P$_1$, P$_2$, . . . P$_j$]). In some implementations, the phrases from the current phrases ([P$_1$, P$_2$, . . . P$_j$]) may be identified as evaluated or unevaluated based data expressly indicating whether a respective phrase is evaluated or unevaluated, or based on a counter, array index, or other data indicating a phrase from the current phrases ([P$_1$, P$_2$, . . . P$_j$]) as the current phrase wherein sequentially earlier phrases from the current phrases ([P$_1$, P$_2$, . . . P$_j$]) are evaluated phrases and the current phrase and sequentially subsequent phrases from the current phrases ([P$_1$, P$_2$, . . . P$_j$]) are unevaluated phrases.

For example, the current phrase (P$_n$) may be "precipitation" and the cardinality of tokens (N$_n$) of the current phrase (P$_n$) may be one (N$_n$=1). In another example, the current phrase (P$_n$) may be "North Carolina" and the cardinality of tokens (N$_n$) of the current phrase (P$_n$) may be two (N$_n$=2).

Object-morphism phrasing 6000 includes identifying token sequences 6200, such as one or more current token sequences, from the current sequence of tokens (Q), that respectively have the current cardinality of tokens, such as using a sliding window with respect to the current sequence of tokens having a window size (k) of the cardinality of tokens (N$_n$) and a step size of one token, wherein the token sequences may partially overlap for windows sizes greater than one (1). In some implementations, the step size may be the cardinality of tokens (N$_n$) and the token sequence may be non-overlapping for windows sizes greater than one (1). Identifying the token sequences 6200 may include storing respective tokens, or token sequences, in an array, or other data structure. In some implementations, the current sequence of tokens (Q) may be expressed as a string and identifying the token sequences 6200 may include tokenizing the current sequence of tokens (Q) to populate the token sequences array, or other data structure.

Object-morphism phrasing 6000 includes identifying semantic-similarity scores 6300 for the current token sequences with respect to the current phrase (P$_n$). A respective semantic-similarity score for a respective current token sequence from the current token sequences indicates a determined semantic similarity between the respective current token sequence and the current phrase ($P_n$) with respect to the low-latency data access and analysis system. In some implementations, the semantic-similarity scores may be values between zero (0) and one (1). The semantic similarity may be identified by determining sentence embeddings mapping a respective current token sequence and the current phrase ($P_n$) as vectors of real numbers and determining a corresponding cosine similarity between the vector for the current token sequence and the vector for the current phrase ($P_n$). Cosine similarity values may be in a range from negative one (−1) to positive one (1). Normalized, or modulus, values in the range from zero (0) to positive one (1) generated for the cosine similarity values may be used. In some implementations, another similarity metric, such as Euclidean distance or dot product may be used. Determining the semantic-similarity scores includes obtaining a first dense vector of sentence embeddings representing for the current phrase, and, for a respective current token sequence from the current token sequences, obtaining a corresponding semantic-similarity score by obtaining a second dense vector representing the respective current token sequence, and determining, as the corresponding semantic-similarity score, a cosine similarity between the first dense vector and the second dense vector. In some implementations, the sentence embeddings may be obtained using a bidirectional context analysis unit.

Object-morphism phrasing 6000 includes identifying a current token sequence 6400 from the current token sequences corresponding to the maximal semantic-similarity score from the semantic-similarity scores.

Although shown separately in FIG. 6, identifying semantic-similarity scores 6300 and identifying a current token sequence 6400 may be combined, which may include identifying, determining, or obtaining, the respective semantic-similarity scores on a per-token sequence basis.

Although not expressly shown in FIG. 6, in some implementations, object-morphism phrasing 6000 may include identifying a current maximal semantic-similarity score having a minimal value, such as 0.0, prior to identifying semantic-similarity scores 6300. Although not expressly shown in FIG. 6, in some implementations, object-morphism phrasing 6000 may include identifying a current maximally similar token sequence having a minimal value, such as an empty string, prior to identifying semantic-similarity scores 6300.

Although not expressly shown in FIG. 6, in some implementations, such as implementations wherein identifying semantic-similarity scores 6300 and identifying a current token sequence 6400 are combined, object-morphism phrasing 6000 may include using an index, or counter, for iterating through the current token sequences. The current token sequence may be obtained from the current token sequences in accordance with the iteration counter and the window size ($N_n$). The current token sequence may be stored in a data structure, such as a string variable data structure. The semantic-similarity score for the current token sequence with respect to the current phrase ($P_n$). The semantic-similarity score for the current token sequence may be stored in a data structure, such as a floating-point variable data structure. The current maximal semantic-similarity score may be determined to be less than the semantic-similarity score for the current token sequence, the semantic-similarity score for the current token sequence may be used as the current maximal semantic-similarity, and the current token sequence may be used as the current maximally similar token sequence. The index, or counter, for iterating through the current token sequences may be incremented, and, in response to a determination that a sum of the current value of the index, or counter, for iterating through the current token sequences and the window size ($N_n$) is less than or equal to the cardinality of sequences of tokens in the current token sequences, a subsequent iteration may be performed. Subsequent to iterating through the current token sequences, the current maximally similar token sequence is the maximally similar token sequence among the current token sequences.

Object-morphism phrasing 6000 includes determining whether a maximal semantic-similarity score from the semantic-similarity scores is less than a defined semantic similarity threshold 6450, such as 0.8.

The maximal semantic-similarity score from the semantic-similarity scores may be greater than or equal to the defined semantic similarity threshold and identifying the data source 6500, determining whether data available from the data source includes the value matching the current token sequence 6550, and including, in the candidate object morphisms, the candidate object morphism that includes the current token sequence 6600, may be omitted for the current iteration.

The maximal semantic-similarity score from the semantic-similarity scores may be less than the defined semantic similarity threshold and identifying the data source 6500, determining whether data available from the data source includes the value matching the current token sequence 6550, and including, in the candidate object morphisms, the candidate object morphism that includes the current token sequence 6600, may be performed for the current iteration.

A data source may be identified 6500, such as in response to determining that the maximal semantic-similarity score is less than the defined semantic similarity threshold. Identifying the data source 6500 includes identifying the data source, which may be a column from a table stored in a database, indicated by the predicate resolved-request data with respect to the current phrase. For example, the predicate resolved-request data with respect to the current phrase may indicate that the current phrase is bound to the data source.

Whether data available from the data source includes a value matching, such as a substring match with, the current token sequence may be determined 6550 by traversing one or more indexes of the low-latency data access and analysis system, such as the constituent data index to determine whether the index indexes the current token sequence and indicates that the current token sequence is stored as a value in the data source. For example, the low-latency data access and analysis system or a component thereof, such as the semantic interface, may determine that the data source includes a value matching, such as a value that is a match for, the current token sequence. In some implementations, determining whether data available from the data source includes a value matching the current token sequence 6550 is performed in accordance with one or more data access or security rules or procedures, such as object-level security, column-level security, row-level security, or a combination thereof, in accordance with the user identifier, such that data that is stored as a value in the data source and is restricted, or otherwise unavailable, in accordance with the data access or security rules or procedures and the user identifier is not matched.

In some implementations, such as implementations wherein determining whether data available from the data source includes the value matching the current token sequence includes traversing one or more indexes of the low-latency data access and analysis system, object-morphism phrasing 6000 may omit accessing the data source to determine whether data available from the data source includes the value matching the current token sequence.

In response to a determination that the data source includes the value matching the current token sequence, a candidate object morphism that includes the current token sequence as bound to the data source for the current phrase is generated and included in the candidate object morphisms 6600. In some implementations, the semantic-similarity score for the current token sequence may be identified as a confidence metric for the candidate object morphism.

In some implementations, generating the candidate object morphism includes including, in the candidate object morphism, the predicate resolved-request data and the current token sequence.

In some implementations, the low-latency data access and analysis system, or a component thereof, such as the object search unit, may include, in the candidate object morphism, an identifier, such as a GUID, for the data source (column) of the candidate object morphism, data identifying an operator, such as the equality operator token, and the current token sequence.

In some implementations, the predicate resolved-request data may include first object-visualization data that is identified as inconsistent with the current token sequence, generating the candidate object morphism and including the candidate object morphism in the candidate object morphisms includes including, in the candidate object morphism, the predicate resolved-request data and generating and including, in the candidate object morphism, second object-visualization data, such that the first object-visualization data is omitted from the candidate object morphism.

Object-morphism phrasing 6000 includes obtaining updated current phrases, an updated current sequence of tokens (Q'), or both 6700. Obtaining the updated current phrases includes obtaining, as updated current phrases, the difference between the current phrases ([$P_1$, $P_2$, ... $P_j$]) and the current phrase ($P_n$), such as by advancing or incrementing a counter or array index for the current phrases ([$P_1$, $P_2$, ... $P_j$]), by storing data identifying the current phrase as an evaluated phrase with the current phrases ([$P_1$, $P_2$, ... $P_j$]), or by subtracting or removing the current phrase ($P_n$) from the current phrases ([$P_1$, $P_2$, ... $P_j$]). For example, obtaining the difference between the current phrases ([$P_1$, $P_2$, ... $P_j$]) and the first phrase ($P_1$) may be expressed as [$P_1$, $P_2$, ... $P_j$]−$P_1$=[$P_2$, ... $P_j$]. Obtaining the updated current phrases may include identifying the current phrase as an evaluated phrase. In some implementations, removing the current phrase to obtain the updated current phrases may be omitted and the updated current phrases may be obtained by copying, to the updated current phrases, the phrases from the current phrases other than the current phrase. Obtaining the updated current sequence of tokens (Q') includes obtaining, as the updated current sequence of tokens (Q'), the difference between the current sequence of tokens (Q) and the current token sequence, such as by advancing or incrementing a counter or array index for the current sequence of tokens, by storing data identifying the current token sequence as an evaluated token sequence, or by subtracting or removing the current token sequence from the current sequence of tokens. In some implementations, obtaining the updated current sequence of tokens (Q') may include removing tokens from the current sequence of tokens or copying tokens from the current sequence of tokens.

Object-morphism phrasing 6000 includes determining whether the updated current phrases include at least one phrase 6750, which is an unevaluated phrase. An unevaluated phrase may be unavailable, such as wherein the updated current phrases omit or exclude unevaluated phrases, such as wherein the current phrases are evaluated phrases, and object-morphism phrasing 6000 includes outputting, or returning, the candidate object morphisms and further iterations of object-morphism phrasing 6800 may be omitted.

The updated current phrases may include at least one phrase, which is an unevaluated phrase, such as on a condition that the updated current phrases include at least one phrase, which is an unevaluated phrase, or in response to a determination that the updated current phrases include at least one phrase, which is an unevaluated phrase, and object-morphism phrasing 6000 includes iteration, wherein object-morphism phrasing 6800 is performed using the updated current phrases as the current phrases and using the updated current sequence of tokens (Q') as the current sequence of tokens.

Although not shown separately in FIG. 6, in some implementations, the updated current phrases may omit or exclude unevaluated phrases and the updated current sequence of tokens (Q') may include one or more tokens, other than the token sequences identified as greater than or equal to the defined semantic similarity threshold and the token sequences corresponding to the candidate object morphisms, and one or more filter values or columns corresponding to the respective tokens may be identified and corresponding data may be output, such as for presentation to a user as candidate search and analysis parameters.

In an example of generating object morphisms during object search 4000 as shown in FIG. 4, including generating candidate object-morphism data 5000 as shown in FIG. 5, including object-morphism phrasing 6000 as shown in FIG. 6, the low-latency data access and analysis system, or a component thereof, such as the object search unit, obtains first data expressing usage intent including the string "measured rainfall in South Carolina" (see 4100 in FIG. 4). The low-latency data access and analysis system, or a component thereof, such as the object search unit, determines that the data expressing usage intent includes object-search request data (see 4200 in FIG. 4). The low-latency data access and analysis system, or a component thereof, such as the object search unit, obtains the object-search resolved-request data representing the object-search terms as a sequence of tokens, including the tokens "measured", "rainfall", "South", and "Carolina" (see 4300 in FIG. 4).

The low-latency data access and analysis system, or a component thereof, such as the object search unit, obtains object-search response data, determines an analytical object consistent with the object-search resolved-request data is unavailable in the object-search response data, and determines that and analytical object partially consistent with the object-search resolved-request data, and including as a defined sequence of tokens, the tokens "precipitation", "North", and "Carolina", is available in the object-search response data (see 4400 in FIG. 4). The low-latency data access and analysis system, or a component thereof, such as the object search unit, generates candidate object-morphism data in accordance with the object-search resolved-request data and the partially consistent analytical object (see 4500 in FIG. 4 and see FIG. 5).

The low-latency data access and analysis system, or a component thereof, such as the object search unit, obtains the defined sequence of tokens, the tokens "precipitation", "North", and "Carolina", from the partially consistent analytical object as predicate resolved-request data (see 5100 in FIG. 5). The low-latency data access and analysis system, or a component thereof, such as the object search unit, obtains, from the predicate resolved-request data, a first phrase ($P_1$) including the token "precipitation", bound to a "precipitation" data source (table), and a second phrase ($P_2$) including the sequence of tokens "North" and "Carolina", bound to a "region" data source (column), wherein the "precipitation" data source (table) includes the "region" data source (column) and stores a record, or row, having the value "North Carolina" (see 5200 in FIG. 5).

The low-latency data access and analysis system, or a component thereof, such as the object search unit, obtains, performs object-morphism phrasing using the phrases ([$P_1$, $P_2$]) as current phrases and using the object-search resolved-request data, including the sequence of tokens "measured", "rainfall", "South", and "Carolina", as a current sequence of tokens (Q) (see 5300 in FIG. 5 and see FIG. 6).

The low-latency data access and analysis system, or a component thereof, such as the object search unit, in a first iteration of object-morphism phrasing, identifies the first phrase ($P_1$) including the token "precipitation", bound to a "precipitation" data source (table), as the current phrase, having the cardinality of tokens ($N_1$) of one ($N_1$=1) (see 6100 in FIG. 6).

The low-latency data access and analysis system, or a component thereof, such as the object search unit, identifies token sequences from the sequence of tokens having the cardinality of one ($N_1$=1), which includes identifying a first token sequence having the cardinality of one (1), "measured", a second token sequence having the cardinality of one (1), "rainfall", a third token sequence having the cardinality of one (1), "South", and a fourth token sequence having the cardinality of one (1), "Carolina" (see 6200 in FIG. 6).

The low-latency data access and analysis system, or a component thereof, such as the object search unit, identifies a semantic-similarity score for the first token sequence, "measured", with respect to the current phrase ($P_1$), "precipitation", as 0.0027, which is the current maximal semantic-similarity score (see 6300 and 6400 in FIG. 6). The low-latency data access and analysis system, or a component thereof, such as the object search unit, identifies a semantic-similarity score for the second token sequence, "rainfall", with respect to the current phrase ($P_1$), "precipitation", as 0.91, which is the current maximal semantic-similarity score (see 6300 and 6400 in FIG. 6). The low-latency data access and analysis system, or a component thereof, such as the object search unit, identifies a semantic-similarity score for the third token sequence, "South", with respect to the current phrase ($P_1$), "precipitation", as 0.00082 (see 6300 and 6400 in FIG. 6). The low-latency data access and analysis system, or a component thereof, such as the object search unit, identifies a semantic-similarity score for the fourth token sequence, "Carolina", with respect to the current phrase ($P_1$), "precipitation", as 0.0 (see 6300 and 6400 in FIG. 6).

The low-latency data access and analysis system, or a component thereof, such as the object search unit, determines that the semantic-similarity score 0.91 for the second token sequence, "rainfall", which is the maximal semantic-similarity score from the semantic-similarity scores, is greater than the defined semantic similarity threshold (0.91>=0.8) (see 6450 and the directional line labeled "NO" in FIG. 6).

The low-latency data access and analysis system, or a component thereof, such as the object search unit, removes the current phrase ($P_1$), "precipitation", from the current phrases to obtain updated current phrases ([$P_2$]) including the second phrase ($P_2$) that has the sequence the tokens "North" and "Carolina", and omitting the first phrase ($P_1$), "precipitation" (see 6700 in FIG. 6).

The low-latency data access and analysis system, or a component thereof, such as the object search unit, removes the second token sequence, "rainfall", from the current sequence of tokens to obtain updated current sequence of tokens (Q'), including the tokens "measured", "South", and "Carolina", and omitting the token "rainfall" (see 6700 in FIG. 6).

The low-latency data access and analysis system, or a component thereof, such as the object search unit, determines that the updated current phrases ([$P_2$]) includes at least one phrase (see 6750 in FIG. 6).

The low-latency data access and analysis system, or a component thereof, such as the object search unit, performs a second iteration of current phrase filtering using the updated current phrases ([$P_2$]) including the second phrase ($P_2$) that has the sequence the tokens "North" and "Carolina", and the updated current sequence of tokens(Q'), including the tokens "measured", "South", and "Carolina" (see 6800 in FIG. 6).

The low-latency data access and analysis system, or a component thereof, such as the object search unit, in the second iteration of object-morphism phrasing, identifies the second phrase ($P_2$) including the sequence the tokens "North" and "Carolina", bound to the "region" data source (column), as the current phrase, having the cardinality of tokens ($N_2$) of two ($N_2$=2) (see 6100 in FIG. 6).

The low-latency data access and analysis system, or a component thereof, such as the object search unit, identifies token sequences from the sequence of tokens having the cardinality of two ($N_2$=2), which includes identifying a first token sequence having the cardinality of two (2), "measured South", and a second token sequence having the cardinality of two (2), "South Carolina" (see 6200 in FIG. 6).

The low-latency data access and analysis system, or a component thereof, such as the object search unit, identifies a semantic-similarity score for the first token sequence, "measured South", with respect to the current phrase ($P_2$), "North Carolina", as 0.1279, which is the current maximal semantic-similarity score (see 6300 and 6400 in FIG. 6). The low-latency data access and analysis system, or a component thereof, such as the object search unit, identifies a semantic-similarity score for the second token sequence, "South Carolina", with respect to the current phrase ($P_2$), "North Carolina", as 0.19189, which is the current maximal semantic-similarity score (see 6300 and 6400 in FIG. 6).

The low-latency data access and analysis system, or a component thereof, such as the object search unit, determines that the semantic-similarity score 0.19189 for the second token sequence, "South Carolina", which is the maximal semantic-similarity score from the semantic-similarity scores, is less than the defined semantic similarity threshold (0.19189<0.8) (see 6450 in FIG. 6).

The low-latency data access and analysis system, or a component thereof, such as the object search unit, identifies the "region" data source (column) bound to the current phrase ($P_2$), "North Carolina" (see 6500 in FIG. 6).

The low-latency data access and analysis system, or a component thereof, such as the object search unit, traverses the constituent data index to determine that the "region" data source (column) of the "precipitation" data source (table) stores a record, or row, having the value "South Carolina" matching the current token sequence "South Carolina" (see 6550 in FIG. 6).

The low-latency data access and analysis system, or a component thereof, such as the object search unit, generates a candidate object morphism that includes the current token sequence, "South Carolina", and includes the candidate object morphism in the candidate object morphisms (see FIG. 6, 6600). The candidate object morphism includes a resolved request that includes, as an ordered sequence of tokens, the "precipitation" token, the "South" token, and the "Carolina" token, wherein the "precipitation" token is bound to the "precipitation" data source (table) and the sequence of the "South" token and the "Carolina" token is bound to the "region" data source (column).

The low-latency data access and analysis system, or a component thereof, such as the object search unit, removes the current phrase ($P_2$), "North Carolina", from the current phrases to obtain updated current phrases ([ ]) omitting the second phrase ($P_2$) and omitting the first phrase ($P_1$) (see 6700 in FIG. 6).

The low-latency data access and analysis system, or a component thereof, such as the object search unit, removes the second token sequence, "South Carolina", from the current sequence of tokens to obtain updated current sequence of tokens (Q'), including the token "measured", and omitting the tokens "rainfall", "South", and "Carolina" (see 6700 in FIG. 6).

The low-latency data access and analysis system, or a component thereof, such as the object search unit, determines that the updated current phrases include zero phrases.

The low-latency data access and analysis system, or a component thereof, such as the object search unit, outputs, or returns, the candidate object morphisms (see 4500 in FIG. 4).

The low-latency data access and analysis system, or a component thereof, such as the object search unit, generates (see FIG. 4, 4600) object-search response data including analytical-object data identified (see FIG. 4, 4400) for the partially consistent analytical object and including the candidate object morphism generated (see FIG. 4, 4500 and see FIG. 6, 6600) with respect to the partially consistent analytical object and the object-search request data.

The low-latency data access and analysis system, or a component thereof, such as the object search unit, obtains second data expressing usage intent identifying the candidate object morphism as a selected candidate object morphism (see 4700 in FIG. 4) and identifying the partially consistent analytical object corresponding to the selected candidate object morphism.

The low-latency data access and analysis system generates an analytical object in accordance with the selected object morphism, which includes generating resolved-request data for the analytical object that includes, as an ordered sequence of tokens, the "precipitation" token, the "South" token, and the "Carolina" token, wherein the "precipitation" token is bound to the "precipitation" data source (table) and the sequence of the "South" token and the "Carolina" token is bound to the "region" data source (column) (see FIG. 4, 4800).

The low-latency data access and analysis system outputs response data (see FIG. 4, 4900) for the generated analytical object (see FIG. 4, 4800), responsive to receiving the second data expressing usage intent (see FIG. 4, 4700), which includes generating a data query for the generated analytical object (see FIG. 4, 4800) and obtaining results data responsive to the data query by executing the data query by a database of the low-latency data access and analysis system, such as the distributed in-memory database 3300 shown in FIG. 3, wherein the "precipitation" data source (table) is stored in the database of the low-latency data access and analysis system, or by sending, transmitting, or otherwise making available, the data query to an external database, wherein the "precipitation" data source (table) is stored in the external database.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random-access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "determine," "identify," "obtain," and "form" or any variations thereof, includes selecting, ascertaining, computing, looking up, receiving, determining, establishing, obtaining, or otherwise identifying or determining in any manner whatsoever using one or more of the devices and methods shown and described herein.

As used herein, the term "computing device" includes any unit, or combination of units, capable of performing any method, or any portion or portions thereof, disclosed herein.

As used herein, the terminology "example," "embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more computer readable mediums having computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Attributes may comprise any data characteristic, category, content, etc. that in one example may be non-quantifiable or non-numeric. Measures may comprise quantifiable numeric values such as sizes, amounts, degrees, etc. For example, a first column containing the names of states may be considered an attribute column and a second column containing the numbers of orders received for the different states may be considered a measure column.

Aspects of the present embodiments are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a computer, such as a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
    obtaining first data expressing usage intent with respect to a low-latency data access and analysis system;
    determining that the first data expressing usage intent includes object-search request data, wherein the object-search request data includes object-search terms; and
    in response to determining that the first data expressing usage intent includes the object-search request data:
        obtaining resolved-request data representing the object-search terms as a sequence of tokens;
        determining that a first analytical object consistent with the resolved-request data is unavailable in the low-latency data access and analysis system;
        determining that a second analytical object partially consistent with the resolved-request data is available in the low-latency data access and analysis system, wherein the second analytical object is consistent with a first portion of the resolved-request data;
        obtaining first object-visualization data representing the second analytical object;
        generating candidate object-morphism data with respect to the second analytical object in accordance with a second portion of the resolved-request data;
        outputting object-search response data including the first object-visualization data and the candidate object-morphism data for presentation to a user;
        obtaining second data expressing usage intent with respect to the low-latency data access and analysis system, the second data expressing usage intent indicating a selected object morphism from the candidate object-morphism data;
        generating a third analytical object in accordance with the second analytical object and the selected object morphism; and
        outputting response data, responsive to the second data expressing usage intent, including second object-visualization data representing the third analytical object for presentation to the user.

2. The method of claim 1, wherein:
    determining that the second analytical object partially consistent with the resolved-request data is available in the low-latency data access and analysis system includes:
        determining that a plurality of analytical objects respectively partially consistent with the resolved-request data is available in the low-latency data access and analysis system, wherein the plurality of analytical objects includes the second analytical object; and
    generating the candidate object-morphism data includes generating respective candidate object-morphism data for respective analytical objects from the plurality of analytical objects.

3. The method of claim 1, wherein generating the candidate object-morphism data includes:
    determining that descriptive data for the second analytical object is consistent with the first portion of the resolved-request data.

4. The method of claim 1, wherein generating the candidate object-morphism data includes:
    obtaining predicate resolved-request data for the second analytical object, wherein the second analytical object was generated in accordance with the predicate resolved-request data.

5. The method of claim 4, wherein generating the candidate object-morphism data includes:
    obtaining a sequence of one or more phrases from the predicate resolved-request data, wherein a respective phrase from the sequence of one or more phrases includes a sequence of one or more tokens; and
    obtaining one or more candidate object morphisms by object-morphism phrasing using the sequence of one or more phrases as current phrases and using the resolved-request data as a current sequence of tokens, wherein object-morphism phrasing includes:
        identifying a current phrase from the current phrases in sequential order, wherein the current phrase includes a current cardinality of tokens;
        identifying one or more current token sequences from the current sequence of tokens, wherein a respective current token sequence from the current token sequences includes the current cardinality of tokens;
        identifying semantic-similarity scores for the current token sequences, wherein a respective semantic-similarity score for a respective current token sequence from the current token sequences indicates a determined semantic similarity between the respective current token sequence and the current phrase;
        identifying a current token sequence from the current token sequences corresponding to a maximal semantic-similarity score from the semantic-similarity scores;
        in response to a determination that the maximal semantic-similarity score is less than a defined semantic similarity threshold:
            identifying a data source indicated by the predicate resolved-request data with respect to the current phrase; and
            determining that the data source includes a value matching the current token sequence and in response to a determination that the data source includes the value matching the current token sequence, including, in the candidate object morphisms, a candidate object morphism that includes the current token sequence;

obtaining, as updated current phrases, a difference between the current phrases and the current phrase;
obtaining, as an updated current sequence of tokens, a difference between the current sequence of tokens and the current token sequence; and
on a condition that the updated current phrases include at least one phrase:
object-morphism phrasing using the updated current phrases as the current phrases and using the updated current sequence of tokens as the current sequence of tokens.

6. The method of claim 5, wherein identifying the semantic-similarity scores includes:
obtaining a first dense vector of sentence embeddings representing for the current phrase; and
for a respective current token sequence from the current token sequences, obtaining a corresponding semantic-similarity score by:
obtaining a second dense vector representing the respective current token sequence; and
determining, as the corresponding semantic-similarity score, a cosine similarity between the first dense vector and the second dense vector.

7. The method of claim 5, wherein including the candidate object morphism in the candidate object morphisms data includes:
including, in the candidate object morphism, the predicate resolved-request data and the current token sequence;
including, in the candidate object morphism, a first portion of the predicate resolved-request data and the current token sequence, such that the second portion of the predicate resolved-request data is omitted from the candidate object morphism; or
including, in the candidate object morphism, the predicate resolved-request data and second object-visualization data, such that the first object-visualization data is omitted from the candidate object morphism.

8. A low-latency data access and analysis system including:
a memory; and
a processor that executes instructions stored on the memory to:
operate an object search unit that generates object morphisms during object search, wherein, to generate the object morphisms during object search, the object search unit executes instructions stored in the low-latency data access and analysis system to:
obtain first data expressing usage intent with respect to a low-latency data access and analysis system;
determine that the first data expressing usage intent includes object-search request data, wherein the object-search request data includes object-search terms; and
in response to determining that the first data expressing usage intent includes the object-search request data:
obtain resolved-request data representing the object-search terms as a sequence of tokens;
determine that a first analytical object consistent with the resolved-request data is unavailable in the low-latency data access and analysis system;
determine that a second analytical object partially consistent with the resolved-request data is available in the low-latency data access and analysis system, wherein the second analytical object is consistent with a first portion of the resolved-request data;
obtain first object-visualization data representing the second analytical object;
generate candidate object-morphism data with respect to the second analytical object in accordance with a second portion of the resolved-request data;
output object-search response data including the first object-visualization data and the candidate object-morphism data for presentation to a user;
obtain second data expressing usage intent with respect to the low-latency data access and analysis system, the second data expressing usage intent indicating a selected object morphism from the candidate object-morphism data;
generate a third analytical object in accordance with the second analytical object and the selected object morphism; and
output response data, responsive to the second data expressing usage intent, including second object-visualization data representing the third analytical object for presentation to the user.

9. The low-latency data access and analysis system of claim 8, wherein:
to determine that the second analytical object partially consistent with the resolved-request data is available in the low-latency data access and analysis system, the object search unit executes the instructions to:
determine that a plurality of analytical objects respectively partially consistent with the resolved-request data is available in the low-latency data access and analysis system, wherein the plurality of analytical objects includes the second analytical object; and
to generate the candidate object-morphism data, the object search unit executes the instructions to generate respective candidate object-morphism data for respective analytical objects from the plurality of analytical objects.

10. The low-latency data access and analysis system of claim 8, wherein to generate the candidate object-morphism data, the object search unit executes the instructions to:
determine that descriptive data for the second analytical object is consistent with the first portion of the resolved-request data.

11. The low-latency data access and analysis system of claim 8, wherein to generate the candidate object-morphism data, the object search unit executes the instructions to:
obtain predicate resolved-request data for the second analytical object, wherein the second analytical object was generated in accordance with the predicate resolved-request data.

12. The low-latency data access and analysis system of claim 11, wherein to generate the candidate object-morphism data, the object search unit executes the instructions to:
obtain a sequence of one or more phrases from the predicate resolved-request data, wherein a respective phrase from the sequence of one or more phrases includes a sequence of one or more tokens; and
obtain one or more candidate object morphisms by object-morphism phrasing using the sequence of one or more phrases as current phrases and using the resolved-request data as a current sequence of tokens, wherein to perform object-morphism phrasing, the object search unit executes the instructions to:
- identify a current phrase from the current phrases in sequential order, wherein the current phrase includes a current cardinality of tokens;
- identify one or more current token sequences from the current sequence of tokens, wherein a respective current token sequence from the current token sequences includes the current cardinality of tokens;
- identify semantic-similarity scores for the current token sequences, wherein a respective semantic-similarity score for a respective current token sequence from the current token sequences indicates a determined semantic similarity between the respective current token sequence and the current phrase;
- identify a current token sequence from the current token sequences corresponding to a maximal semantic-similarity score from the semantic-similarity scores;
- in response to a determination that the maximal semantic-similarity score is less than a defined semantic similarity threshold:
  - identify a data source indicated by the predicate resolved-request data with respect to the current phrase; and
  - determine that the data source includes a value matching the current token sequence and in response to a determination that the data source includes the value matching the current token sequence, including, in the candidate object morphisms, a candidate object morphism that includes the current token sequence;
- obtain, as updated current phrases, a difference between the current phrases and the current phrase;
- obtain, as an updated current sequence of tokens, a difference between the current sequence of tokens and the current token sequence; and
- on a condition that the updated current phrases include at least one phrase:
  - perform object-morphism phrasing using the updated current phrases as the current phrases and using the updated current sequence of tokens as the current sequence of tokens.

13. The low-latency data access and analysis system of claim 12, wherein to identify the semantic-similarity scores, the object search unit executes the instructions to:
- obtain a first dense vector of sentence embeddings representing for the current phrase; and
- for a respective current token sequence from the current token sequences, obtain a corresponding semantic-similarity score by:
  - obtain a second dense vector representing the respective current token sequence; and
  - determine, as the corresponding semantic-similarity score, a cosine similarity between the first dense vector and the second dense vector.

14. The low-latency data access and analysis system of claim 13, wherein to include the candidate object morphism in the candidate object morphisms data, the object search unit executes the instructions to:
- include, in the candidate object morphism, the predicate resolved-request data and the current token sequence;
- include, in the candidate object morphism, a first portion of the predicate resolved-request data and the current token sequence, such that the second portion of the predicate resolved-request data is omitted from the candidate object morphism; or
- include, in the candidate object morphism, the predicate resolved-request data and second object-visualization data, such that the first object-visualization data is omitted from the candidate object morphism.

15. A method comprising:
generating object morphisms during object search in a low-latency data access and analysis system, wherein generating the object morphisms includes:
- in response to obtaining resolved-request data representing object-search request data, wherein a previously generated first analytical object available in the low-latency data access and analysis system is partially consistent with the resolved-request data and is consistent with a first portion of the resolved-request data, generating candidate object-morphism data with respect to the first analytical object in accordance with a second portion of the resolved-request data;
- generating a second analytical object in accordance with the first analytical object and a selected object morphism from the candidate object-morphism data, wherein the second analytical object differs from the first analytical object; and
- outputting analytical object data for the second analytical object for presentation to a user.

16. The method of claim 15, wherein generating the object morphisms includes:
- obtaining the object-search request data, wherein the object-search request data includes object-search terms;
- obtaining the resolved-request data, wherein representing the object-search request data includes representing the object-search terms as a sequence of tokens;
- determining that the first analytical object is available in the low-latency data access and analysis system;
- outputting the candidate object-morphism data for presentation to the user; and
- obtaining data indicating the selected object morphism from the candidate object-morphism data.

17. The method of claim 16, wherein:
- determining that the first analytical object is available in the low-latency data access and analysis system includes determining that analytical objects respectively partially consistent with the resolved-request data are available in the low-latency data access and analysis system, wherein the analytical objects include the first analytical object; and
- generating the candidate object-morphism data includes generating respective candidate object-morphism data for respective analytical objects from the analytical objects.

18. The method of claim 16, wherein generating the candidate object-morphism data includes:
- determining that descriptive data for the first analytical object is consistent with the first portion of the resolved-request data.

19. The method of claim 16, further comprising:
prior to obtaining the object-search request data:
- obtaining second resolved-request data; and
- generating the first analytical object in accordance with the second resolved-request data.

20. The method of claim 19, wherein generating the candidate object-morphism data includes:
- obtaining the second resolved-request data from the first analytical object as predicate resolved-request data;
- obtaining a sequence of one or more phrases from the predicate resolved-request data, wherein a respective phrase from the sequence of one or more phrases includes a sequence of one or more tokens; and obtaining one or more candidate object morphisms by object-morphism phrasing using the sequence of one or more phrases as current phrases and using the resolved-request data as a current sequence of tokens, wherein object-morphism phrasing includes:
- identifying a current phrase from the current phrases in sequential order, wherein the current phrase includes a current cardinality of tokens;
- identifying one or more current token sequences from the current sequence of tokens, wherein a respective current token sequence from the current token sequences includes the current cardinality of tokens;
- identifying semantic-similarity scores for the current token sequences, wherein a respective semantic-similarity score for a respective current token sequence from the current token sequences indicates a determined semantic similarity between the respective current token sequence and the current phrase;
- identifying a current token sequence from the current token sequences corresponding to a maximal semantic-similarity score from the semantic-similarity scores;
- in response to a determination that the maximal semantic-similarity score is less than a defined semantic similarity threshold:
  - identifying a data source indicated by the predicate resolved-request data with respect to the current phrase; and
  - determining that the data source includes a value matching the current token sequence and in response to a determination that the data source includes the value matching the current token sequence, including, in the candidate object morphisms, a candidate object morphism that includes the current token sequence;
- obtaining, as updated current phrases, a difference between the current phrases and the current phrase;
- obtaining, as an updated current sequence of tokens, a difference between the current sequence of tokens and the current token sequence; and
- on a condition that the updated current phrases include at least one phrase:
  - object-morphism phrasing using the updated current phrases as the current phrases and using the updated current sequence of tokens as the current sequence of tokens.

* * * * *